US007487462B2

(12) United States Patent
Good et al.

(10) Patent No.: US 7,487,462 B2
(45) Date of Patent: Feb. 3, 2009

(54) METHODS AND SYSTEMS FOR INDICATING INVISIBLE CONTENTS OF WORKSPACE

(75) Inventors: Lance E. Good, Cupertino, CA (US); Mark J. Stefik, Portola Valley, CA (US); Jock D. Mackinlay, Palo Alto, CA (US); Polle Zellweger, Palo Alto, CA (US); Patrick M Baudisch, Seattle, WA (US)

(73) Assignee: Xerox Corporation, Norwalk, CT (US)

( * ) Notice: Subject to any disclaimer, the term of this patent is extended or adjusted under 35 U.S.C. 154(b) by 826 days.

(21) Appl. No.: 10/369,617

(22) Filed: Feb. 21, 2003

(65) Prior Publication Data

US 2003/0156124 A1 Aug. 21, 2003

Related U.S. Application Data

(60) Provisional application No. 60/357,850, filed on Feb. 21, 2002.

(51) Int. Cl.
*G06F 3/048* (2006.01)
(52) U.S. Cl. .................. 715/778; 715/804; 715/805; 715/788; 345/620
(58) Field of Classification Search .......... 715/775, 715/778, 805
See application file for complete search history.

(56) References Cited

U.S. PATENT DOCUMENTS

| 4,312,577 | A | * | 1/1982 | Fitzgerald | .................. | 353/12 |
| 5,077,668 | A | | 12/1991 | Doi | | |
| 5,257,186 | A | | 10/1993 | Ukita et al. | | |
| 5,278,980 | A | | 1/1994 | Pedersen et al. | | |
| 5,305,435 | A | * | 4/1994 | Bronson | .................. | 715/777 |
| 5,339,391 | A | | 8/1994 | Wroblewski et al. | | |
| 5,384,703 | A | | 1/1995 | Withgott et al. | | |
| 5,479,600 | A | | 12/1995 | Wroblewski et al. | | |
| 5,689,716 | A | | 11/1997 | Chen | | |
| 5,710,899 | A | * | 1/1998 | Eick | .................. | 715/764 |

(Continued)

OTHER PUBLICATIONS

Malone, "How Do People Organize Their Desks? Implications for the Design of Office Information Systems", Jan. 1983, ACM Press, ACM Transactions on Information Systems (TOIS) vol. 1, Issue 1, pp. 99-112.*

(Continued)

*Primary Examiner*—Tadesse Hailu
*Assistant Examiner*—Alvin H Tan
(74) *Attorney, Agent, or Firm*—Oliff & Berridge, PLC

(57) ABSTRACT

Techniques for displaying contextual information in clipped views of two-dimensional workspaces are provided. A method for indicating an object includes: providing a workspace having a viewed space and a populated space, the viewed space being delineated by a border; determining an object in the populated space; determining a direction of the object from the viewed space; and indicating the object with an indicator on the border of the viewed space in the direction of the object. The distance of the object may determine the appearance of the indicator. The indicator may also show a user's interest. An object indicating system includes: an object determination circuit that determines an object in a populated space and a direction of the object from a viewed space; and an indicator mapping block that indicates the object with an indicator on a border of the viewed space in the direction of the object.

46 Claims, 21 Drawing Sheets

U.S. PATENT DOCUMENTS

| | | | | |
|---|---|---|---|---|
| 5,742,285 | A * | 4/1998 | Ueda | 715/778 |
| 5,745,602 | A | 4/1998 | Chen et al. | |
| 5,757,290 | A * | 5/1998 | Watanabe et al. | 340/995.14 |
| 5,757,358 | A * | 5/1998 | Osga | 715/862 |
| 5,778,397 | A | 7/1998 | Kupiec et al. | |
| 5,838,323 | A | 11/1998 | Rose et al. | |
| 5,838,326 | A * | 11/1998 | Card et al. | 715/775 |
| 5,844,559 | A * | 12/1998 | Guha | 715/846 |
| 5,867,164 | A | 2/1999 | Bornstein et al. | |
| 5,918,240 | A | 6/1999 | Kupiec et al. | |
| 5,924,108 | A | 7/1999 | Fein et al. | |
| 5,945,998 | A * | 8/1999 | Eick | 345/589 |
| 5,971,580 | A * | 10/1999 | Hall et al. | 700/83 |
| 5,978,820 | A | 11/1999 | Mase et al. | |
| 6,160,553 | A * | 12/2000 | Robertson et al. | 715/767 |
| 6,163,318 | A * | 12/2000 | Fukuda et al. | 715/803 |
| 6,185,592 | B1 | 2/2001 | Boguraev et al. | |
| 6,243,093 | B1 | 6/2001 | Czerwinski et al. | |
| 6,256,648 | B1 * | 7/2001 | Hill et al. | 715/501.1 |
| 6,289,304 | B1 | 9/2001 | Grefenstette | |
| 6,606,101 | B1 * | 8/2003 | Malamud et al. | 715/715 |
| 6,658,626 | B1 * | 12/2003 | Aiken | 715/526 |
| 6,691,282 | B1 * | 2/2004 | Rochford et al. | 715/514 |
| 6,735,520 | B2 * | 5/2004 | Nozaki | 701/211 |
| 6,909,443 | B1 * | 6/2005 | Robertson et al. | 715/782 |
| 7,043,277 | B1 * | 5/2006 | Pfister | 455/566 |

OTHER PUBLICATIONS

E. Ayers et al., "Using Graphic History in Browsing the World Wide Web", The 4th International World Wide Web Conference, www.w3.org/Conferences/WWW4/Program_Full.html, Dec. 11-14, 1996.

B. Bederson et al., Jazz: An Extensible Zoomable User Interface Graphics Toolkit in Java., *Proceedings of UIST 2000*, pp. 171-180, (2000).

T. Berlage, "A Selective Undo Mechanism for Graphical user Interfaces Based on Command Objects", *ACM Transactions on Computer-Human Interaction*, vol. 1, No. 3, pp. 269-294, 1994.

R. Gandhi et al., "Domain Name Based Visualization of Web Histories in a Zoomable User Interface", In Proceedings of 11th International Workshop on Database and Expert Systems Applications—Second International Workshop on Web-Based Information Visualization (WebVis 2000), *IEEE Computer Society*, pp. 591-598, 2000.

R. Hightower et al., "PadPrints: Graphical Multiscale Web Histories", *Proceedings of UIST*, pp. 121-122, 1998.

W. Hill et al., "Edit Wear and Read Wear", *Proceedings of CHI '92*, pp. 3-9.

D. Kurlander et al., "Editable Graphical Histories", *IEEE 1988 Workshop on Visual Languages*, pp. 416-423, 1988.

B. Myers et al., "A Multi-View Intelligent Editor for Digital Video Libraries", *Intelligent Editor for Digital Video Libraries*, submitted for publication, pp. 1-10, 2001.

C. Ahlberg et al., "The Alphaslider: A Compact and Rapid Selector", *Proceedings of CHI*, pp. 365-371, 1994.

Y. Ayatsuka et al., "Popup Vernier: a Tool for Sub-pixel-pitch Dragging with Smooth Mode Transition", *Proceedings of UIST*, pp. 39-48, 1998.

T. Ball et al., "Software Visualization in the Large", *IEEE Computer*, vol. 29, No. 4, pp. 33-43, 1996.

B. Bederson et al., "Pad++: A Zoomable Graphical Sketchpad For Exploring Alternate Interface Physics", *Journal of Visual Languages and Computing*, vol. 7, pp. 3-31, 1996.

D. Byrd, "A Scrollbar-based Visualization for Document Navigation", *Proceedings of the fourth ACM conference on Digital Libraries*, pp. 122-129, 1999.

D. Cox et al., "The Usability of Transparent Overview Layers", *Proceedings of CHI*, pp. 301-302, 1998.

A. Dieberger et al., "A City Metaphor to Support Navigation in Complex Information Spaces", *Journal of Visual Languages and Computing*, vol. 9, pp. 597-622, 1998.

G. Furnas, "Generalized Fisheye Views", *Proceedings of CHI*, pp. 16-23, 1986.

C. Manning et al., "Dirty Hands", *Foundations of Statistical Natural Language Processing*, MIT Press, pp. 31-34, 1999.

M. Hearst, "TileBars: Visualization of Term Distribution Information in Full Text Information Access." *Proceedings of CHI '95*, pp. 59-66, 1995.

T. Masui, "LensBar—Visualization for Browsing and Filtering Large Lists of Data", *Proceedings of Info Vis*, 1998.

S. McCrickard et al., "Beyond the Scrollbar: An Evolution and Evaluation of Alternative Navigation Techniques", *Proceedings of the IEEE Symposium on Visual Languages*, pp. 270-277, 1999.

S. Pook et al., "Context and Interaction in Zoomable User Interfaces", *Proceedings of the ACM Conference on Advanced Visual Interfaces*, pp. 227-231 & 317, 2000.

F. Shipman et al., "Beyond Location: Hypertext Workspaces and Non-Linear Views", *Proceedings of the Tenth ACM Conference on Hypertext and Hypermedia*, pp. 121-130, 1999.

B. Shneiderman, "Designing the User Interface: Strategies for Effective Human Computer Interaction", *Addison-Wesley*, pp. 451-452, 1998.

R. Spence et al., "Data Base Navigation: An Office Environment for the Professional", *Behavior and Information Technology*, pp. 43-54, 1982.

G. Robertson et al., "The Document Lens", *Proceedings of UIST'93*, pp. 101-108, 1993.

B. Bederson et al., "Implementing a Zooming User Interface: Experience Buidling Pad++", *Software: Practice and Experience*, vol. 28, No. 10, pp. 1101-1135, 1998.

S. Card et al., "Degree-of-Interest Trees: A Component of an Attention-Responsive User Interface", submitted to *CHI*, 2002.

D. Nation et al., "Browse Hierarchical Data with the Degree of Interest Tree", submitted to *CHI*, 2002.

K. Perlin et al., "Pad: An Alternative Approach to the Computer Interface", *Proceedings of 1993 ACM SIGGRAPH Conference*, pp. 57-64, 1993.

O. Buyukkokten et al., "Accordion Summarization for End-Game Browsing on PDAs and Cellular Phones", *CHI 2001*, pp. 213-220, 2001.

M. Czerwinski et al., "Visualizing Implicit Queries For Information Management and Retrieval", *Proceedings of CHI'99*, pp. 560-567, 1999.

D. Hederson, Jr. et al., "Rooms: The Use of Multiple Virtual Workspaces to Reduce Space Contention in a Window-Based Graphical User Interface", *ACM Transactions on Grpahics*, vol. 5, No. 3, pp. 211-243, 1986.

D. Jerding et al., "The Information Mural: A Technique for Displaying and Navigating Large Information Spaces", *IEEE Transactions on Visualization and Computer Graphics*, vol. 4, No. 3, pp. 257-271, 1998.

T. Malone, How Do People Organize Their Desks? Implications for the Design of Office Information Systems, *ACM Transactions on Office Information Systems*, vol. 1, No. 1, pp. 99-112, 1983.

M. Stefik et al., Beyond the Chalkboard: Computer Support for Collaboration and Problem Solving in Meetings, *Communications of the ACM*, vol. 30, No. 1, pp. 32-47, 1987.

A. Woodruff et al., "Using Thumbnails to Search the Web", *Conference Proceedings of CHI2001*, vol. 3, Issue 1, pp. 198-205, 552, 2001.

W. Estes, Classification and Cognition, New York Oxford University Press, pp. 32-87, 1994.

K. Knight et al., "Statistics-Based Summarization—Step One: Sentence Compression", *American Association for Artificial Intelligence*, 2000.

M. Mills et al., "A Magnifier Tool for Video Data", *CHI '92*, pp. 93-98, 1992.

Co-pending U.S. Appl. No. 10/369,613 to Benjamin Bederson et al.., filed Feb. 21, 2003, entitled Methods and Systems for Incrementally Changing Text Representation.

Co-pending U.S. Appl. No. 10/369,612 to Lance E. Good et al.., filed Feb. 21, 2003, entitled Methods and Systems for Navigating a Workspace.

Co-pending U.S. Appl. No. 10/369,624 to Lance E. Good et al., filed Feb. 21, 2003, entitled Methods and Systems for Interactive Classification of Objects.

Co-pending U.S. Appl. No. 10/369,614 to Benjamin Bederson et al., filed Feb. 21, 2003, entitled Methods and Systems for Incrementally Changing Text Representation.

* cited by examiner

METHODS AND SYSTEMS FOR INDICATING INVISIBLE CONTENTS OF WORKSPACE

This non-provisional application claims the benefit of U.S. Provisional Application No. 60/357,850, entitled "Zooming Interfaces For Sensemaking, Visualization, and Navigation" which was filed on Feb. 21, 2002, and is hereby incorporated by reference in its entirety.

RELATED APPLICATIONS

The following related U.S. patent applications are hereby incorporated herein by reference in their entirety:

U.S. patent application Ser. No. 10/371,017, entitled "System and Method for Interaction of Graphical Objects on a Computer Controlled System";

U.S. patent application Ser. No. 10,371,263, entitled "System and Method for Moving Graphical Objects on a Computer Controlled System";

U.S. patent application Ser. No. 10/369,613, entitled "Method and System for Incrementally Changing Text Representation";

U.S. patent application Ser. No. 10,369,613, entitled "Method and System for Incrementally Changing Text Representation";

U.S. patent application Ser. No. 10,369,612, entitled "Methods and Systems for Navigating a Workspace"; and U.S. patent application Ser. No. 10/369,624, entitled "Methods and Systems for Interactive Classification of Objects".

BACKGROUND OF THE INVENTION

1. Field of Invention

This invention relates to methods and systems for indicating invisible contents of workspace.

2. Description of Related Art

"Sensemaking" is a process of gathering, understanding, and using the information for a purpose. A sensemaker performing sensemaking gathers information, identifies and extracts portions of the information, organizes the portions for efficient use, and incorporates the portion of the information in a work product with structures.

Sensemaking tasks on information that requires a large space to work, or a workspace, for example, using a computer display and the like, raise problems. If the computer system attempts to display the entire workspace, the information becomes too small and thus illegible. On the other hand, if the system attempts to display a section of the information in detail, then the sensemaker cannot view the other sections that are outside of the view. The sensemaker often chooses the latter for legibility. In such situations, the sensemaker still desires to be aware of information in the unviewable, or peripheral, space.

Conventional techniques used to solve problems in peripheral awareness include "overview-and-detail" techniques and "fisheye" techniques.

FIG. 1 shows a typical example of a workspace. A workspace 100 includes objects 110-140 and may be divided into two spaces; viewed space, or focus space 150, which is to be displayed on a display device and the like, and a populated space, or peripheral space 160, which is generally not visible on the display device, but is depicted for a better understanding of this invention. The overview-and-detail display duplicates the representation of overview of the peripheral space 160 usually in a reduced magnification, while showing detailed, or normal view of the focus space 150. In contrast, one fisheye technique generally presents a single coherent view in which the focus space 150 and the peripheral space 160 appear at the same time, but the peripheral space 160 may be distorted.

Another fisheye technique is a continuous fisheye. The continuous fisheye uses continuous distortion to smoothly vary from allocating more space to the focus and less space to the context. Alternatively, a step fisheye divides the display into regions of varying detail. Typically, one region in the step fisheye provides a full-scale view of some part of the space while the other regions display context at a reduced level of detail.

For linear documents, one-dimensional scrollbars provide a full overview of the document. As the underlying document's length changes, the scrollbar must adapt by manipulating the (theoretical) horizontal and vertical zoom factors independently to coordinate with the underlying document's aspect ratio changes. Since the typical one-dimensional scrollbar does not display document content, the scroll bar does not suffer from the distortion that would otherwise be inevitable with such a technique. In contrast, scrollbars for two-dimensional documents act as coupled partial overviews rather than views of the entire space. The scrollbars do not need to control the horizontal and vertical zoom factors independently; rather, the scrollbars display linearly independent strips of the underlying space.

Scrollbars provide two main insights into the relationship of the current view to the total space. Such insights include the relative position of the current view in the entire space and the size of the current view relative to the size of the entire space. Through tight coupling to the main workspace display, scrollbars also provide three standard navigational aids: the scrollbar thumb can be manipulated to affect corresponding changes in the view; the scrollbar trough can be clicked to jump to a particular location in the space through coarse fixed increments; and/or the scrollbar buttons can be clicked to move in fine fixed increments through the space.

One modification to such scrollbars is representing document content in the scrollbar trough. U.S. Pat. Nos. 5,339,391 and 5,479,600 to Wroblewski et al. disclose such an approach. Wroblewski teaches techniques for using the scrollbar to linear documents rather than two-dimensional spaces. The techniques are particularly suited for linear documents where the scrollbar represents an overview of the entire space and allows the visualization to remain relatively stable. When these techniques are extended to two dimensions (i.e., both vertical and horizontal directions) where the scrollbars represent linear strips of the workspace, the visualization in one axis must vary with a thumb movement of the alternate axis.

SUMMARY OF THE INVENTION

A basic and recurring challenge in graphical user interface (GUI) design is to provide an effective means for user to work with more information than can fit on a display. In sensemaking models of information work in two-dimensional spaces, the user creates, collects, deletes, modifies, arranges, and relates information to build structure and understanding. These operations are considered as components of external cognition. A fundamental challenge in the design of a two-dimensional workspace is to support detailed authoring operations while still providing context or awareness of the workspace.

This invention provides several simplified fisheye techniques for displaying contextual information in clipped views of two-dimensional information workspaces. In various exemplary embodiments, this invention provides systems and methods for indicating invisible contents of the workspace.

In various exemplary embodiments of the methods for indicating an object according to this invention, a workspace is provided that has a viewed space and a populated space, the viewed space being divided from the populated space by a border. The location and size, for example, of an object in the populated space are determined. A direction of the object from the viewed space is determined. The object is indicated with an indicator on the border of the viewed space of the direction of the object.

In various exemplary embodiments of the systems for indicating an object according to this invention, an object determination circuit determines an object in a populated space and a direction of the object from a viewed space. An indicator mapping block indicates the object with an indicator on a border of the viewed space of the direction of the at least one object.

Furthermore, different types of indicators may be used based on distance of an object from the viewed space, contents of the object, and/or links to and/or from the object. Such indicators provide the sensemaker better peripheral awareness of the workspace.

BRIEF DESCRIPTION OF THE DRAWINGS

Various exemplary embodiments of this invention are described in detail, with reference to the following figures, wherein.

DETAILED DESCRIPTION OF EXEMPLARY EMBODIMENTS

While the invention is described hereafter with reference to a computer system and/or display, it should be understood that this invention is not strictly limited to such systems. Rather, any system that is capable of performing the functions described below may be contemplated by this invention. The description is intended to convey the features of the invention without limiting the invention to the specific embodiments disclosed.

Techniques for indicating objects in a populated space according to this invention can be used to increase a user's awareness of objects that are in a workspace. To provide awareness of objects in the populated space, information about clipped objects is provided. Such information about a clipped object may include many elements, such as a direction of the object from the border, a distance to the object from the border, a size of the object, a type of the object, a recency of the object or a time since last the object was edited, relationship to one or more viewed objects, and/or a summary of information content of the object.

Figure 1:
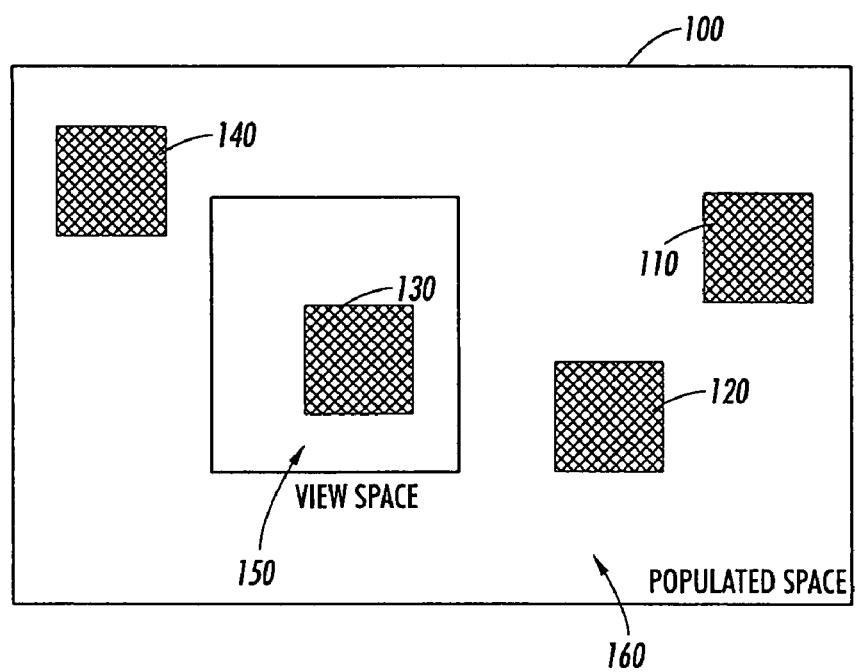
FIG. 1 shows an explanatory diagram of a workspace.
Figure 2:
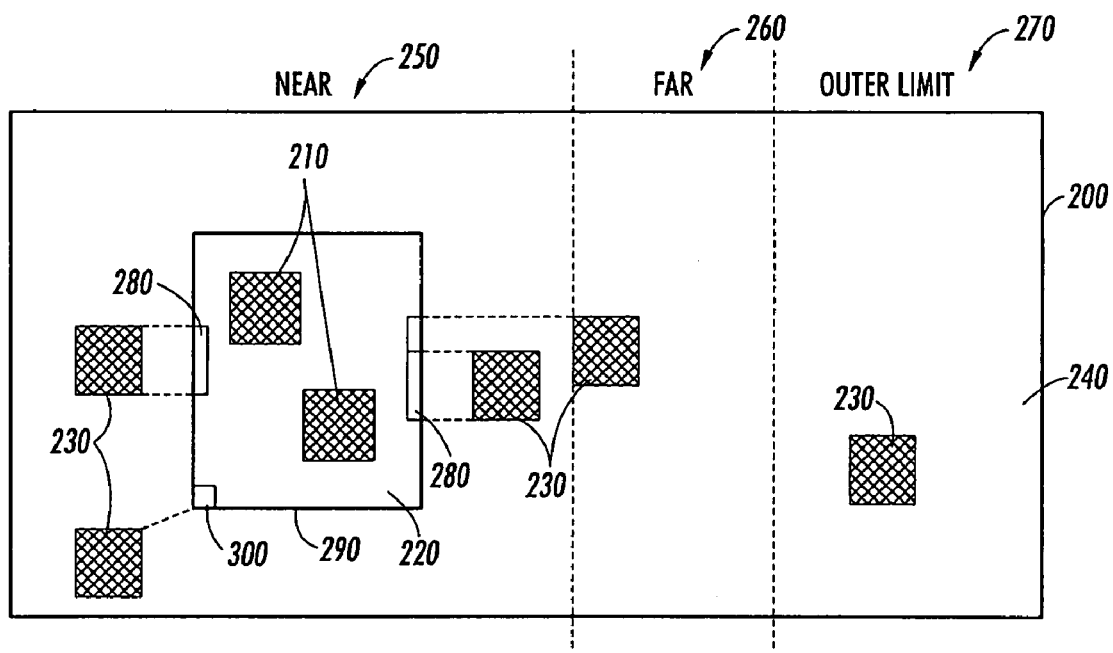
FIG. 2 shows a first exemplary embodiment of an indicating system according to this invention showing various sections in a workspace.

FIG. 2 shows a first exemplary embodiment of the indicators according to this invention. In FIG. 2, a workspace 200 includes objects 210 that are visible inside a viewed space 220, and objects 230 that are in a populated space 240. The workspace 200 may be divided to a near region 250, a far region 260 and an outer limit region 270. Indicators 280 may be shown on a border 290 bounding the populated space 240 to delineate the edges of the viewed space 220. Orthogonal projections may be used for the indicators 280 of the objects 230 in the populated space 240 onto the border 290. Because the orthogonal projection indicators 280 ignore objects in the corners, a corner indicator 300 may be added to indicate when objects were in the corner regions.

Indicators for objects in the different regions may be differentiated with colors. Indicators for objects in the near region 250, or "near objects", may be a brighter color, and indicators for objects in the far region 260, or "far objects" may be a darker color, for example. An indicator 280 for objects that are nearer than a boundary of the near region 250 and the far region 260 may be colored light green, for example. Indicators for objects that are farther than this boundary, but closer than the outer limit region 270 may be colored dark green, for example. Objects in the outer limit region 270 maybe indicated with another color or may not be indicated. Indicators for near objects may occlude indicators for far objects. It is appreciated that the indicators may be presented in different appearance, for example, if the indicators occlude other indicators.

As described above, this embodiment uses a small, fixed amount of the viewed space 220 on the border 290 for the indicators 280 to provide awareness of objects in the populated space 240. The primary advantage to limiting the space for the indicators 280 is that the majority of the viewed space 220 is left undisturbed. Such undisturbed space frees the user from having to adjust to a novel presentation of data in the focus region. More importantly, the user does not have to learn new techniques for authoring in a warped or distorted space. Instead, this embodiment can help prevent the user from losing his/her focus on the viewed space since the indicators are shown in a small amount of space and/or appear as if such indicators were not there. The most basic form of the indicators may use a line one pixel wide on the frame, for example.

The need for peripheral awareness often exists simultaneously at multiple levels in a hierarchy. Nested hierarchy levels can themselves introduce problems in managing focus and context. The user may need to maintain regions of focus at several levels simultaneously when dealing with nested hierarchy levels. Various embodiments of this invention enables clipping of the populated spaces around each viewed space at any level, and manages the competition for screen space for each viewed space.

The methods and systems according to this invention may be incorporated in a system such as that disclosed in co-pending, co-assigned U.S. patent application Ser. No. 10/371,017, entitled "System and method for interaction of graphical object on a computer controlled system," which is incorporated herein by reference in its entirety.

Figure 3:
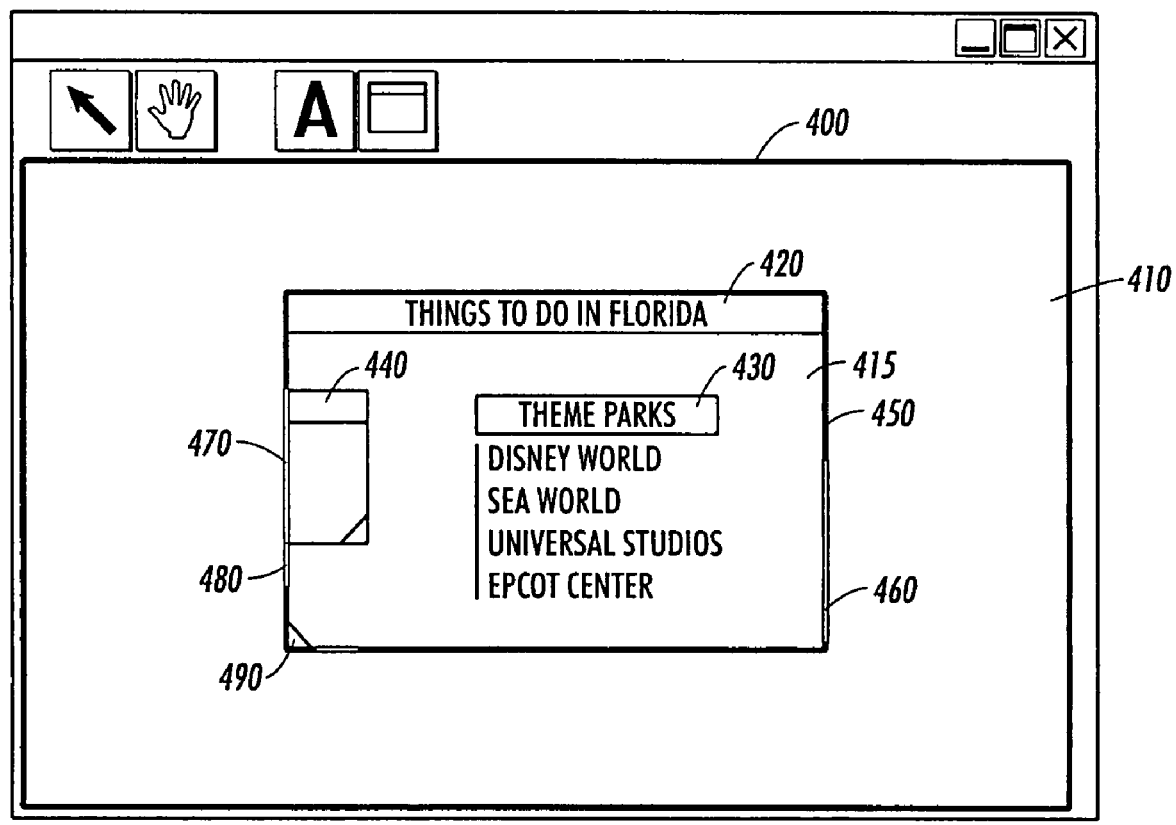
FIG. 3 shows a second exemplary embodiment of an indicating system according to this invention.

FIG. 3 shows a second exemplary embodiment having indicators on a frame.

In this exemplary embodiment, a workspace 410 is provided within a frame 400 defining a viewed space. If the workspace 410 is larger than the viewed space, the workspace 410 may be panned and/or zoomed (i.e., a magnification of the frame 400 and the workspace 410 may be changed).

Within the workspace 410, there is a subspace 420 that may include sub-objects 430 and 440, for example. The subspace 420 is also an object and may have an object frame 450 defining a viewed space for the subspace 420. The object frame 450 may have one or more indicators 460-490 thereon indicating peripheral object outside the viewed space.

Each of the indicators 460-490 indicates that there is an object in the workspace 415 of the subspace 420 in directions of the respective indicator 460-490. As shown in FIG. 3, the indicators 470 and 480 may be occluded and/or be different colors to indicate how far each object is from the frame 450 (i.e., in what region objects are).

The technique according to the second exemplary embodiment may emphasize an increased access to the detailed focal region over efficient interactions with the visualization. The indicators function as indicators for peripheral awareness, but may also function as editing or navigation tools. The second exemplary embodiment may have a number of modifiable properties. For example, the indicators can be adjusted for different levels of interactivity, altered in the degree of permanence, or composed in various ways. A spectrum of variations in the design can be described by choices in each of the categories in the following exemplary equation:

Degree-of-Interest (DOI)×Visual Transfer Function × Permanence×Interactivity×Composition According to various embodiments of this invention, a degree-of-interest (DOI) function may be used to determine the relevance of objects out of view and a visual transfer function to map object information to visual properties on the display or viewed space. Exemplary methods and systems for determining the DOI function include those disclosed in a co-pending, co-assigned U.S. patent application Ser. No. 10/369,612, entitled "Methods and Systems for Returning to Previous Workspace," which is incorporated herein by reference in its entirety.

Exemplary properties for determining the user's interest in clipped objects include those that describe physical characteristics, such as size, shape, distance, and scale.

Another exemplary property involves object content. For instance, a user may enter a search phrase and explicitly invoke a search function, or the user may select an object and the system may implicitly search for information objects related to the selected object. Other regions may be categorized as matching in various ways, such as if the other regions contain matching words, relate to the same "topic," or have links to similar or corresponding objects. The system may indicate matching objects found in the search by simultaneously coloring visible objects that match and/or by coloring or annotating the indicators for objects that are clipped.

Information about the history of an object may also be important for the DOI function. For example, information such as when an object was created, when and how often the object was modified, or how long the object was in focus (i.e., objects in the viewed space and/or objects manipulated by the user) may be important. Identifying such object histories in the indicators can give a sense of places that the user previously found interesting.

The indicators need not be mapped only to properties of individual objects. The indicators can also be mapped to spatial relationships or arrangements involving multiple objects. For example, the DOI function may consider characteristics of object clusters, such as size or compactness of the clusters. Similarly, the number of links between particular objects for the indicators may be used to indicate the relative importance of the objects in the populated space to objects in the viewed space.

Off-screen actions, that is, actions taken in the populated space, may also produce useful information for the indicators. For example, actions to an object may change the status of the indicator for the object. If the status of an object in the populated space has changed, an indicator for the object on a frame may flash or otherwise indicate the change in status.

One of the mappings of this visual transfer function that is fundamental to various exemplary embodiments of this invention is that of object position onto location in the indicators. Nevertheless, there is flexibility in determining the projection to use for object positions. For example, FIG. 2 shows the use of an orthographic projection. However, the mapping technique makes special considerations for objects in the corners, as indicated by the indicator 490 in FIG. 3. In contrast, a radial projection may be more consistent in certain situations (such as for round windows) and may work well for large spaces.

There is a relatively small number of variables onto which the DOI values may be mapped. The number of variables becomes even smaller as the size of the indicators decreases. Visual variables must also be used with caution as the visual complexity of the indicators can interfere with content in the focused view.

Major visual properties to which DOI values may be assigned may be size and color. As the number of pixels allocated to the indicators increases, properties, such as shape, texture, and independent fills and borders, may be differentiated. Flashing may also be used to signal extremely important properties or events.

Depending on the tasks supported in a workspace, the need for permanence in the system may vary. For instance, if the indicators are infrequently used, the indicators may be made visible only when the indicators are needed or requested.

The indicators may also choose a midpoint along the permanence spectrum by providing a ramping or swelling interface. A ramping interface may initially use a minimal amount of screen space and grow in accordance with the user's growing interest, such as time the user spends at a corresponding object, in peripheral information.

Different levels of permanence may be assigned to different DOI properties. Certain properties have inherent degrees of permanence. For instance, physical object properties and object relationships may be provided by relatively permanent displays, while the properties and relationships of asynchronous, off-screen events may be provided by a more transient display.

A minimal display may be used for the indicators when the indicators are not meant to function as a primary editing or navigation tool. As discussed below, alternative implementations include increasing the size of the indicators for more efficient interactivity or temporarily swelling the indicators for a burst of interactions.

Various exemplary embodiments of the systems and methods according to the invention provide a variety of potentially useful interactions. One valuable interaction may be tool tips or other lightweight identifications of peripheral objects. Similarly, navigational aids, such as jumping to the information represented by the peripheral cue may be provided. Modification operations may also be supported, such as dragging and copying/moving information from objects in the peripheral space onto the current workspace.

In addition, depending on the distance of the objects in the peripheral space from the viewed space, an outer border may display indicators for distant objects and an inner border may display indicators for neighboring objects.

Using the above-described considerations, several different variations for mapping are contemplated.

Figure 4:
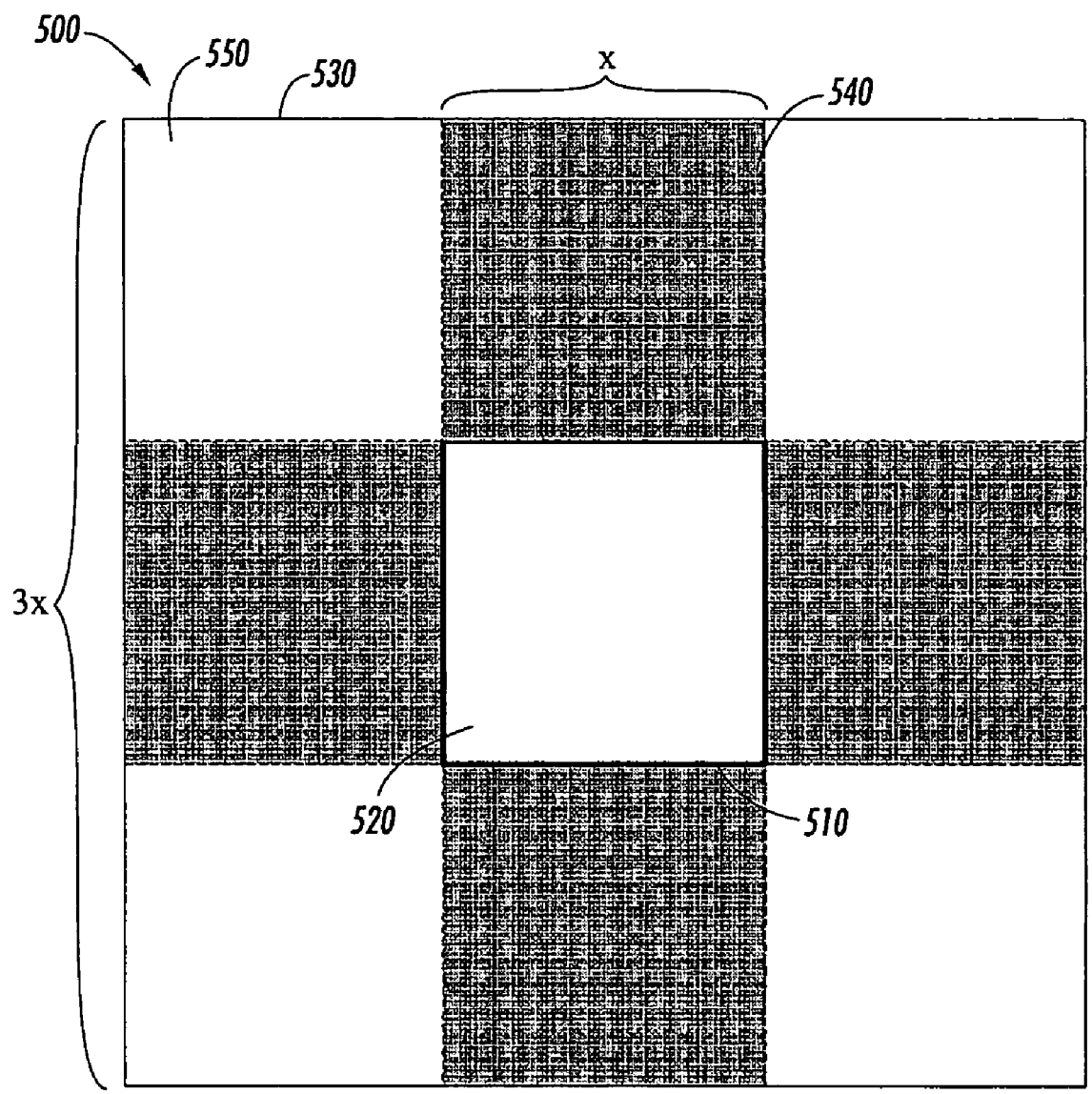
FIGS. 4 and 5 show an explanation of how a corner area scales and how that relates to an orthogonal projection according to this invention.
Figure 5:
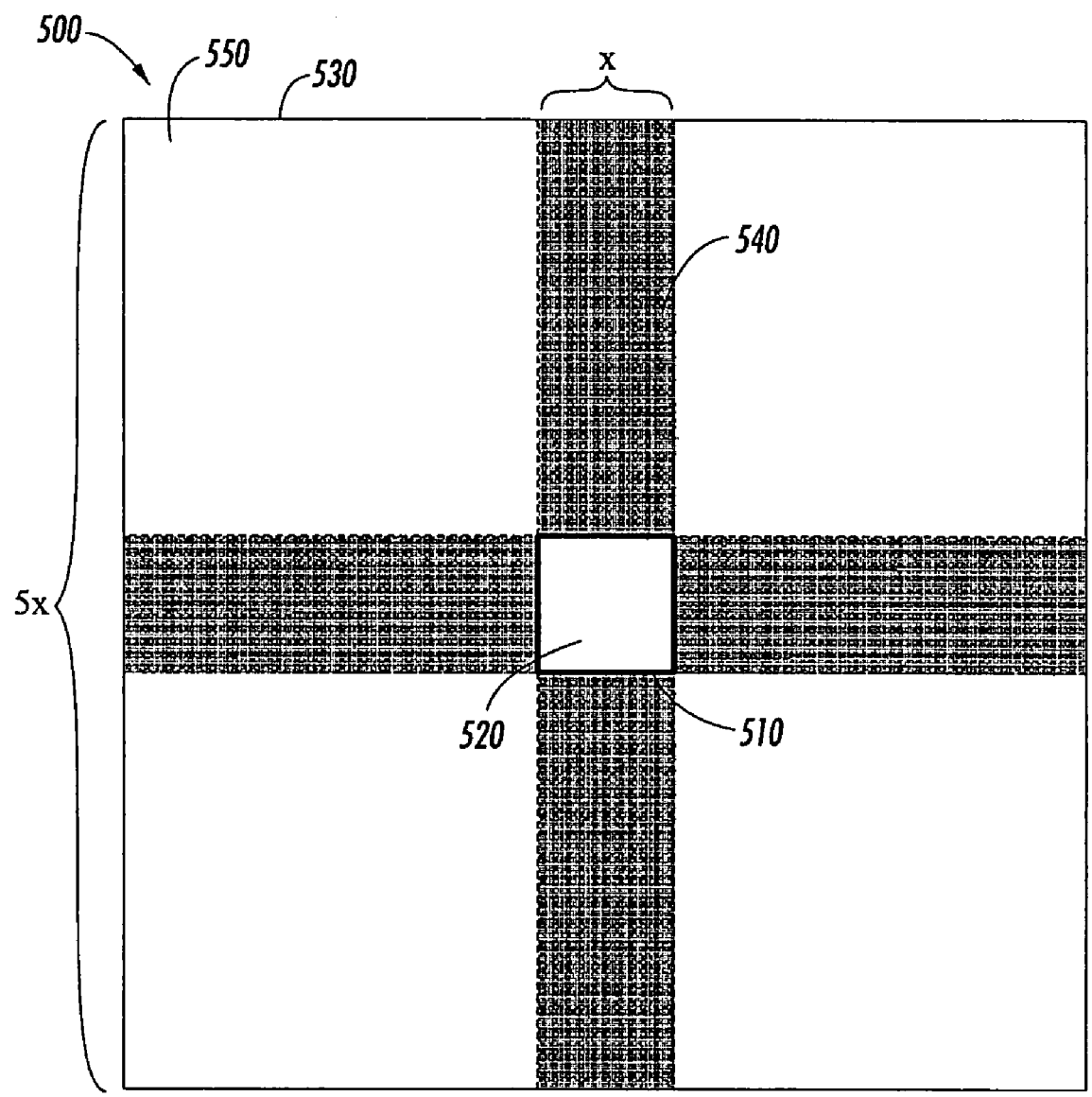

FIGS. 4 and 5 show relationships between the ratios of the length of the sides of the viewed space with respect to the size of the populated space. The rectangles 510 in the center in the workspace 500 shown in FIGS. 4 and 5 represent borders for the viewed space 520, and the outer rectangle represents borders 530 for the workspace 500. The shaded areas 540 represent the locations of the set of objects projected onto the viewed space borders 510 by an orthogonal projection. As the ratio of the lengths of the sides of populated space 550 to the lengths of the sides of the viewed space increases, the percentage of objects in the blind spots, i.e., corners increases in proportion to the square of this ratio.

As seen from FIG. 5, if the length of sides of a viewed space border 510 is short compared to the area of the populated area 550, more space is represented using corner indicators. In such a case, the use of a radial rather than orthogonal projection may help provide better peripheral awareness of the objects in the workspace. Consequently, the radial projection may perform more consistently when the populated space is much larger than the viewed space.

Creating minimal peripheral displays as described above may be useful in the design of the workspace and indicators. The design may emphasize increased access to the detailed focal region over efficient interactions with the visualization of indicators. The indicators provide peripheral awareness, but may or may not function as editing or navigation tools.

Figure 6:
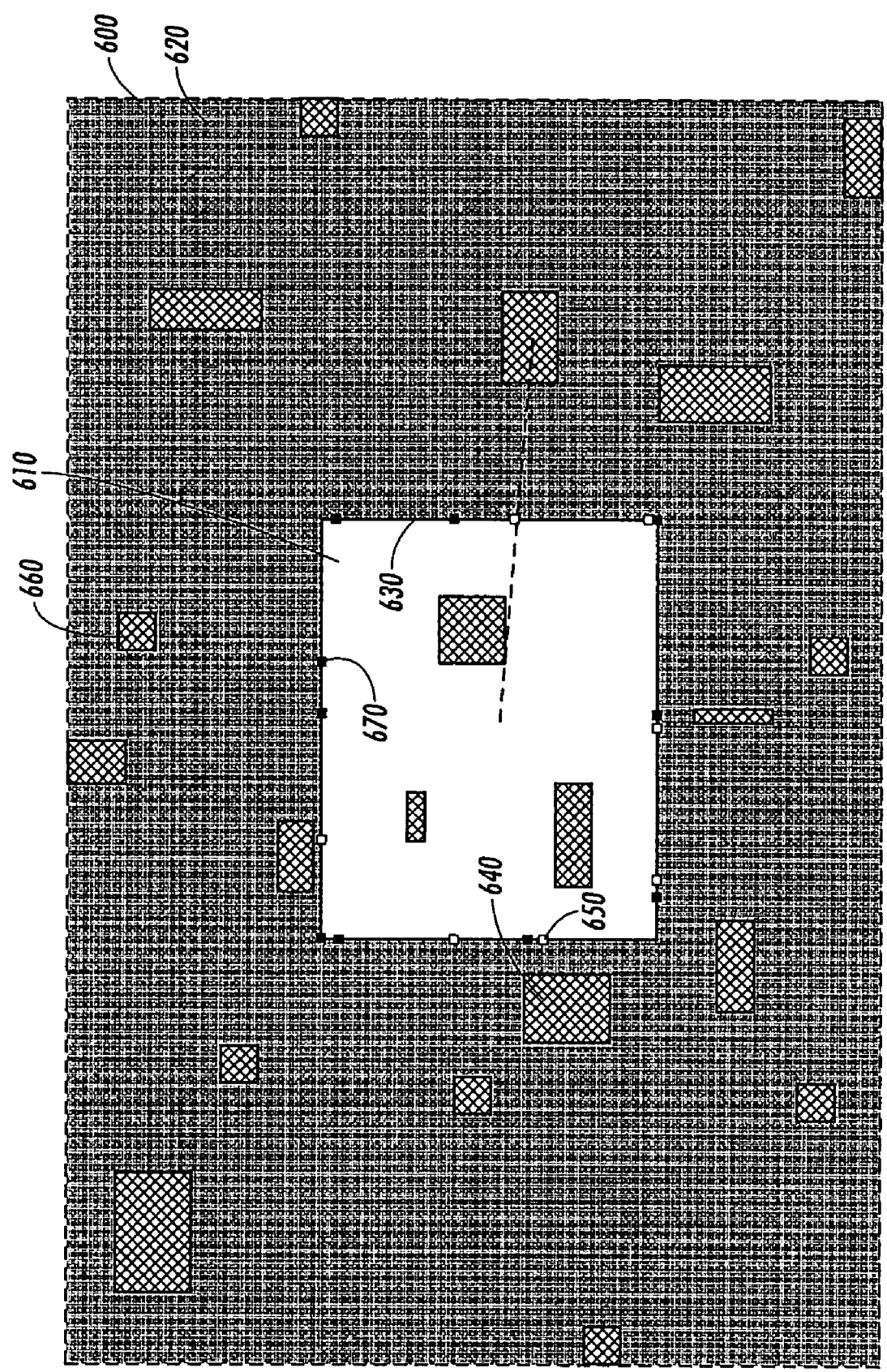
FIG. 6 shows a third exemplary embodiment of an indicating system according to this invention.

FIG. 6 shows a third exemplary embodiment including a workspace 600 combining a viewed space 610 and a populated space 620. In the third exemplary embodiment, centers of objects in the populated space 620 are mapped as point indicators on a window border 630 of the viewed space 610 using a radial projection. A color is assigned to each indicator that proportionally differs based on the object's relative distance to the window border 630. For example, an object 640 that is relatively closer to the viewed space 610 has an indicator 650 of a proportionally brighter shade, while an object 660 has an indicator 670 of a proportionally darker shade. This color can either be determined by a visualization algorithm, such as a linear variation based on distance, and/or by a user's preference.

Figure 7:
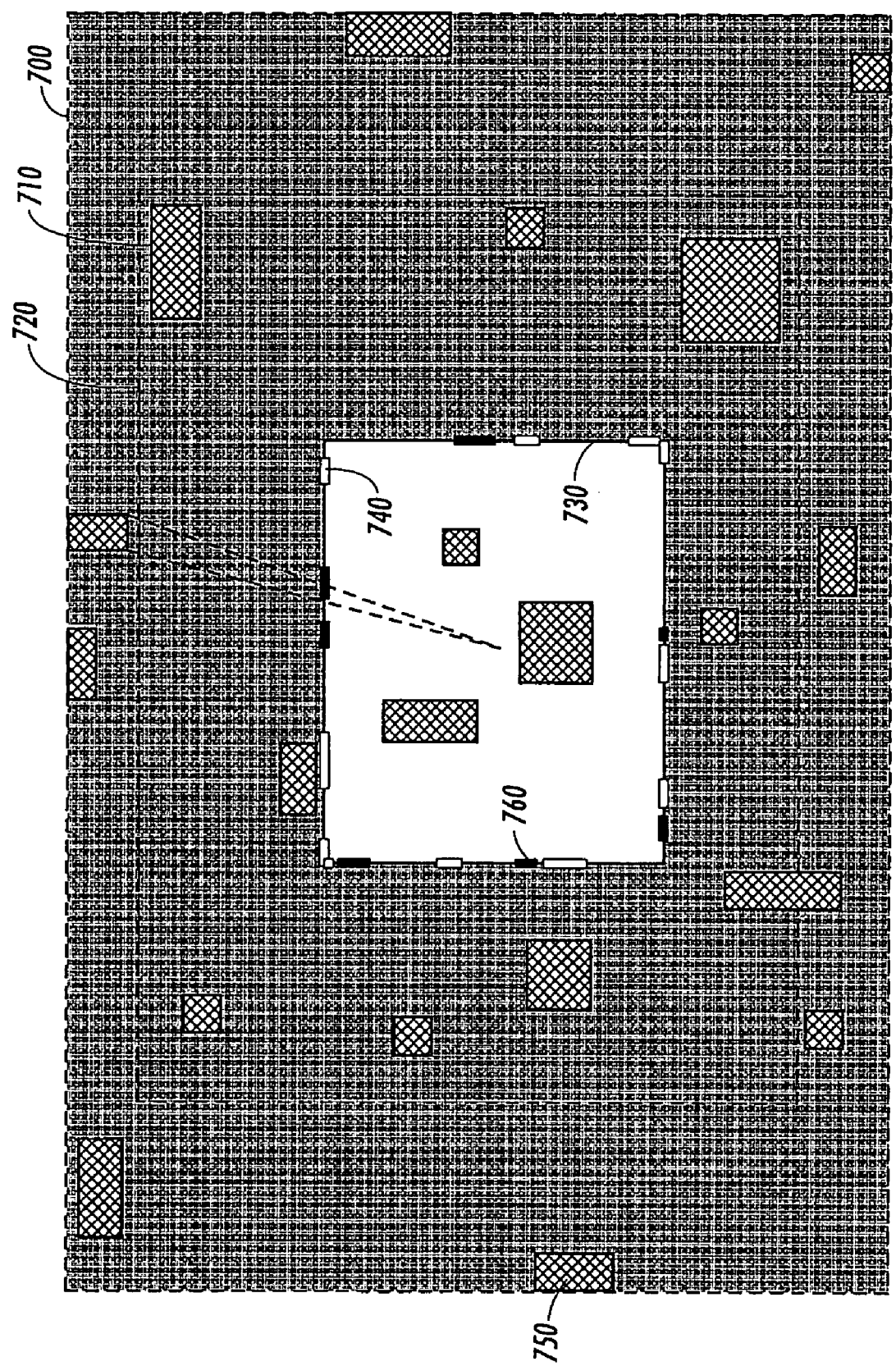
FIG. 7 shows a fourth exemplary embodiment of an indicating system according to this invention.

FIG. 7 shows a fourth exemplary embodiment in which objects in the populated area are indicated based on a boundary in the populated space. In FIG. 7, in a workspace 700, an object 710 between a boundary 720 and a window border 730 is determined to be in a "near" zone, and is indicated by a relatively brighter indicator 740. An object 750 located beyond the boundary 720 are determined to be in a "far" zone, and is indicated by a darker indicator 760. FIG. 7 uses one dimensional indicators (lines) to show peripheral objects, again using a radial projection with color again indicating whether the objects are in the near or far zone. Using line rather than points as indicators gives information about the size of the peripheral object, but it also takes more space along the border for a single object. These characteristics can influence whether indicator points or lines are a good choice for a particular instance.

Figure 8:
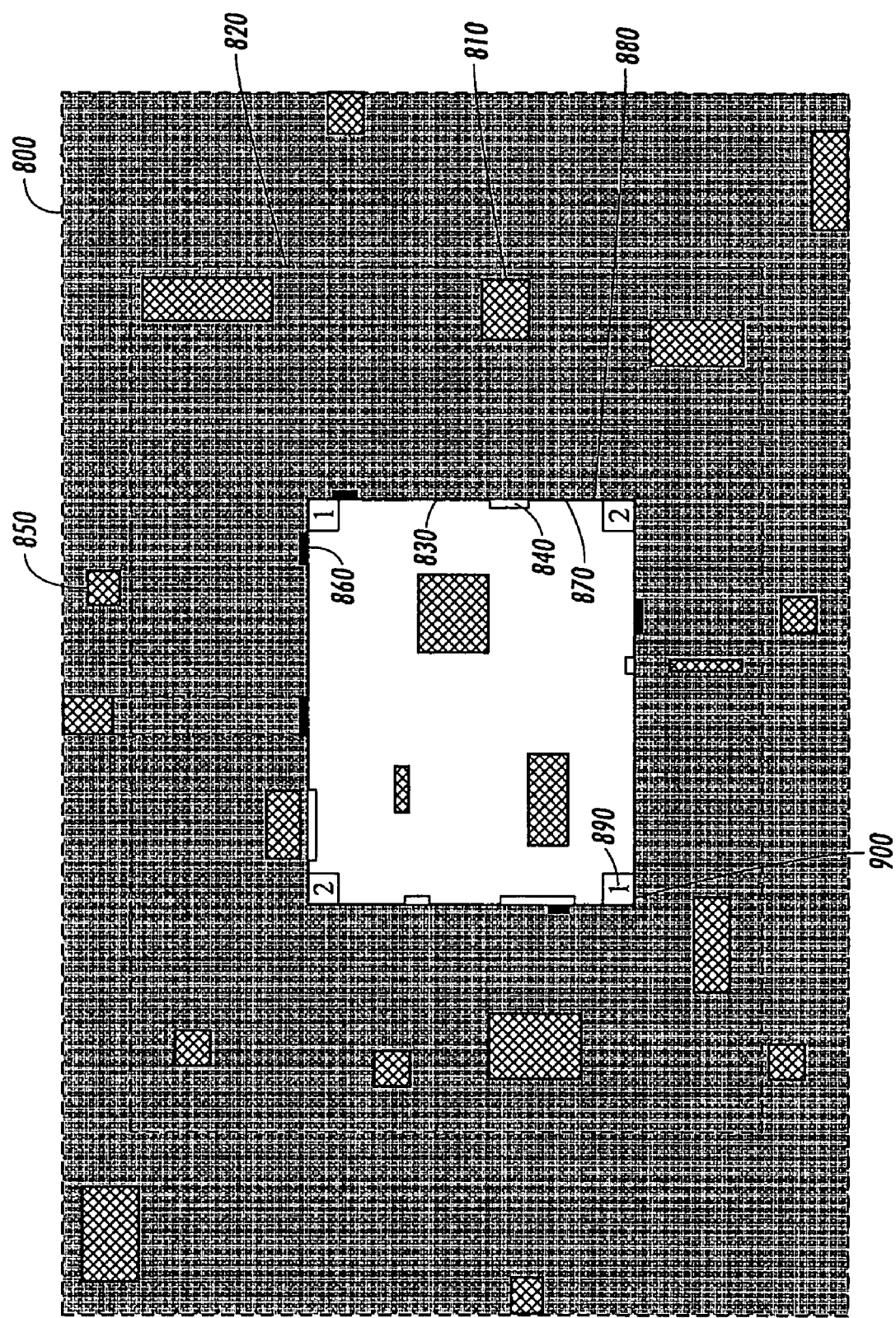
FIG. 8 shows a fifth exemplary embodiment of an indicating system according to this invention.

FIG. 8 shows a fifth exemplary embodiment using an orthogonal projection. Similar to the fourth exemplary embodiment shown in FIG. 7, in FIG. 8, in a workspace 800, an object 810 between a boundary 820 and a window border 830 is indicated with an indicator 840 indicating a near object in a relatively bright color, and an object 850 located beyond the boundary 820 is indicated with an indicator 860 indicating a far object in a darker color. In this exemplary embodiment, the indicator 860 indicating a near object is projected on the inside 870 of the window border 830, and the indicator 840 indicating a far object is projected on the outside 880 of the window border 830. In the fifth exemplary embodiment, counters 890 indicate the number of corner objects represented by a corner projection 900. It should be appreciated that the projection indicators 840, 860 and 900 and the counters 890 described above can be separately used alone or with other types of indictors.

Figure 9:
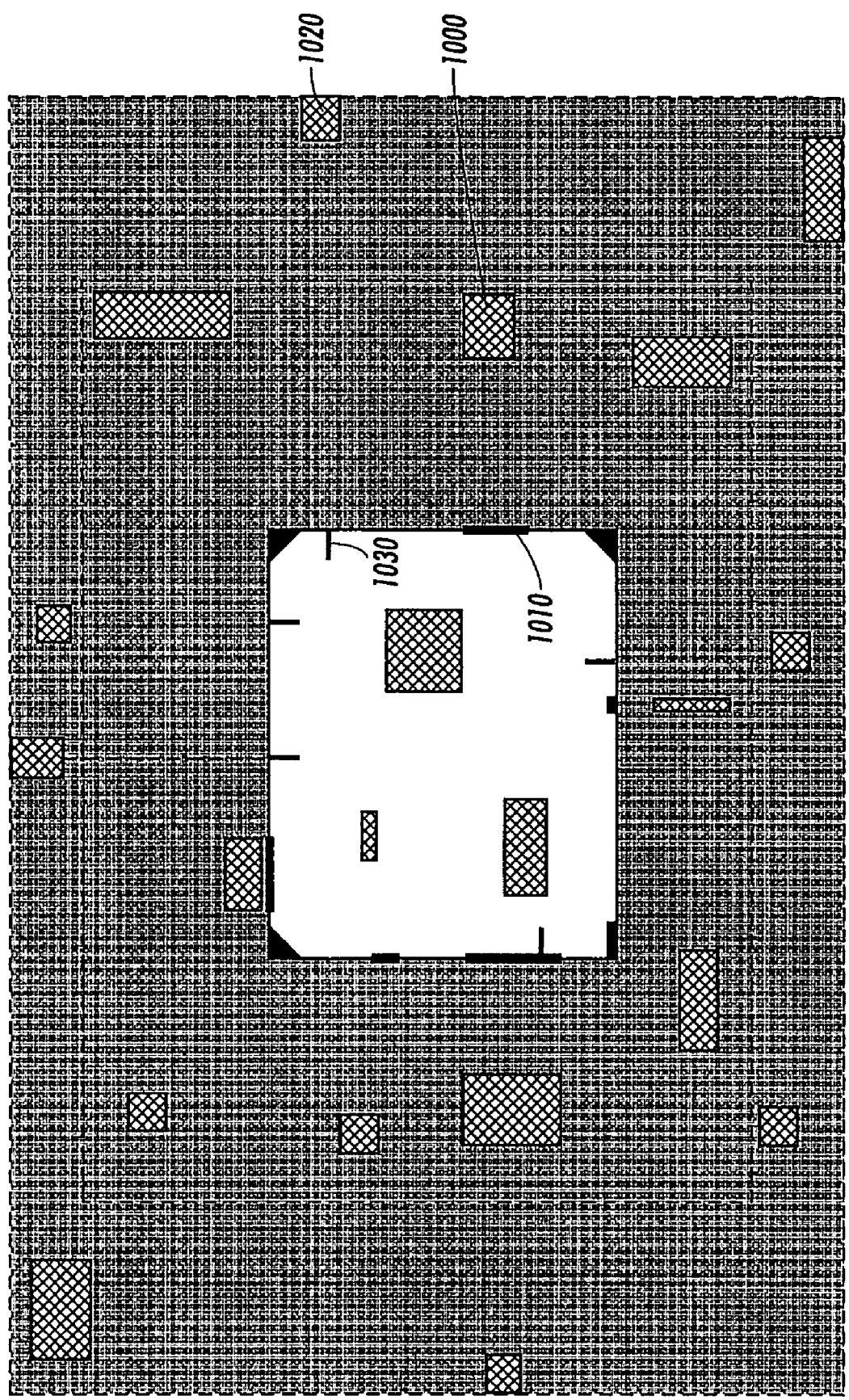
FIG. 9 shows a sixth exemplary embodiment of an indicating system according to this invention.

Distance classifications may also be used to show less detail for more distant objects. For example, in the sixth exemplary embodiment shown in FIG. 9, a near object 1000 is indicated by a linear indicator 1010, while a far object 1020 is indicated by a point indicator 1030, for example, based on the center of the far object 1020. The indicators 1010 and 1030 may be presented in different colors to better indicate the near objects over the far objects.

Figure 10:
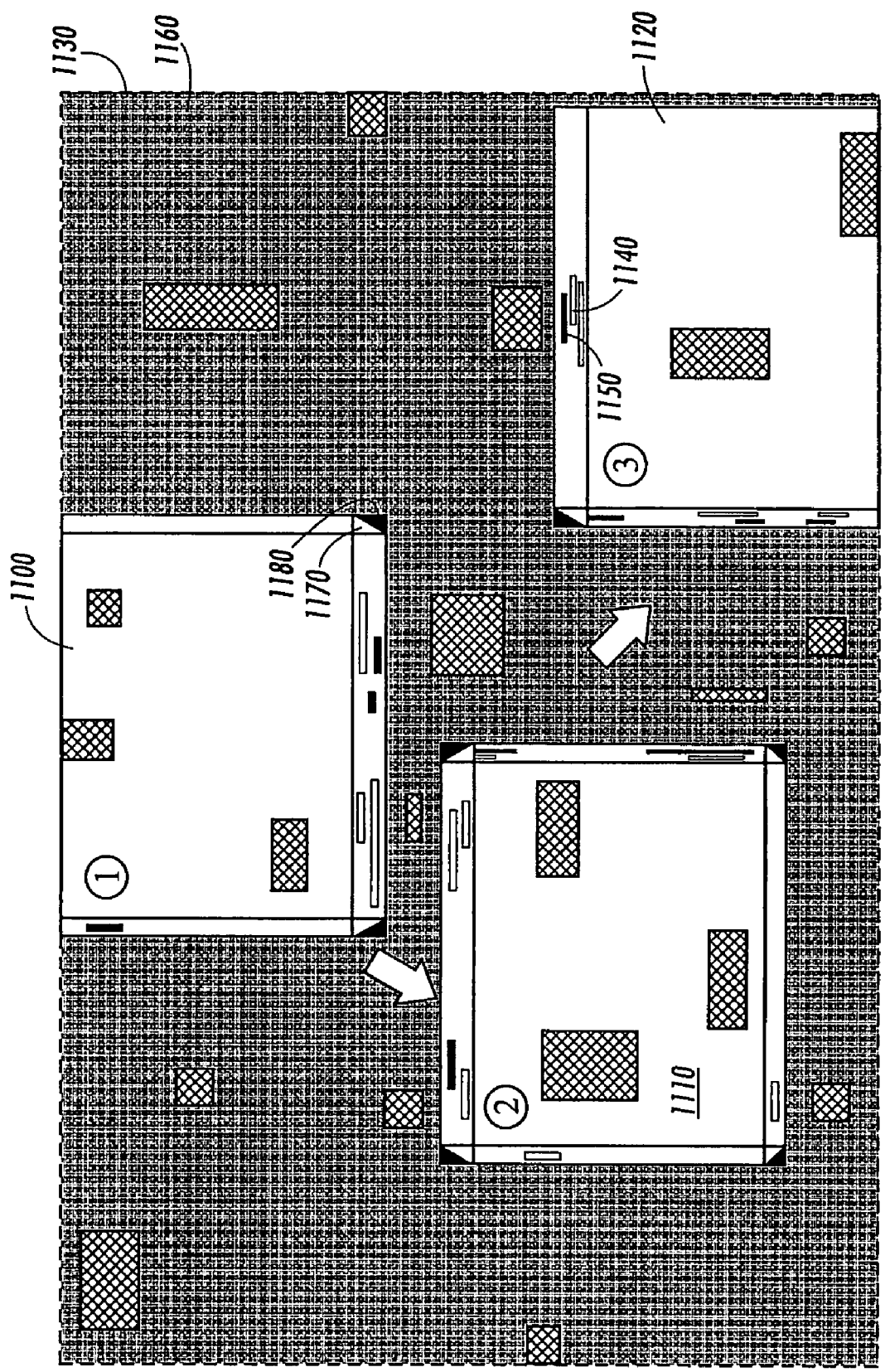
FIG. 10 shows a seventh exemplary embodiment of an indicating system according to this invention.

FIG. 10 shows a seventh exemplary embodiment of representing indicators according to this invention. In FIG. 10, three successive viewed spaces 1100, 1110 and 1120 represent different spatial positions within a workspace 1130. The thickness and length of the indicators, such as indicators 1140 and 1150, on a given side at each viewed space 1100, 1110 and 1120 indicates the vertical and horizontal size of objects in a populated space 1160 in the respective direction. For example, because the entire populated space 1160 lies above and to the left of the viewed space 1120, the indicators appear only on the top and left sides of the viewed space 1120. The brighter indicators 1140 may be used to indicate near objects, and the darker indicators 1150 may be used to indicate far objects. Brighter and darker corner indicators 1170 and 1180 denote the presence of near and far objects that do not project onto a side.

Figure 11:
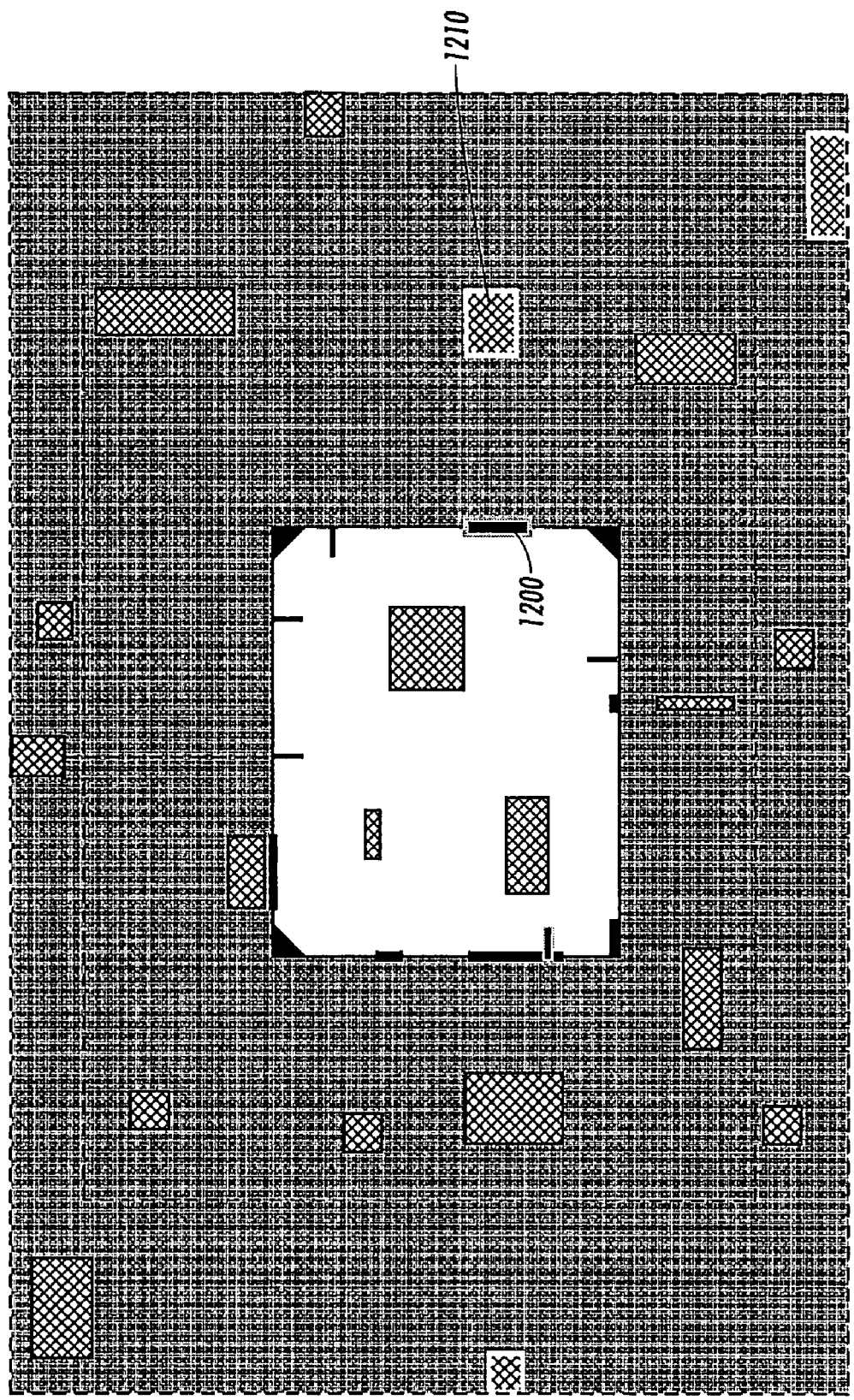
FIG. 11 shows a eighth exemplary embodiment of an indicating system according to this invention.

As discussed above, awareness of object histories can also be of interest to the user. Hence, historical properties, such as the amount of time an object was in focus, the number of times an object has been modified, and/or the time since last modification, may be used to create a variety of history-based indicators. FIG. 11 shows an eighth exemplary embodiment of indicators according to the invention. In FIG. 11, an indicator 1200 may be highlighted to indicate a more recently used object, such as an object 1210. The object may be highlighted if the object was created, modified or viewed within a predetermined time. The number of indicators that may be highlighted may also be defined. In addition, in this exemplary embodiment, only a frame of the indicator 1200 is highlighted. However, it is appreciated that the indicator 1200 may be highlighted over its entire area and/or may flash or otherwise be distinguished.

Figure 12:
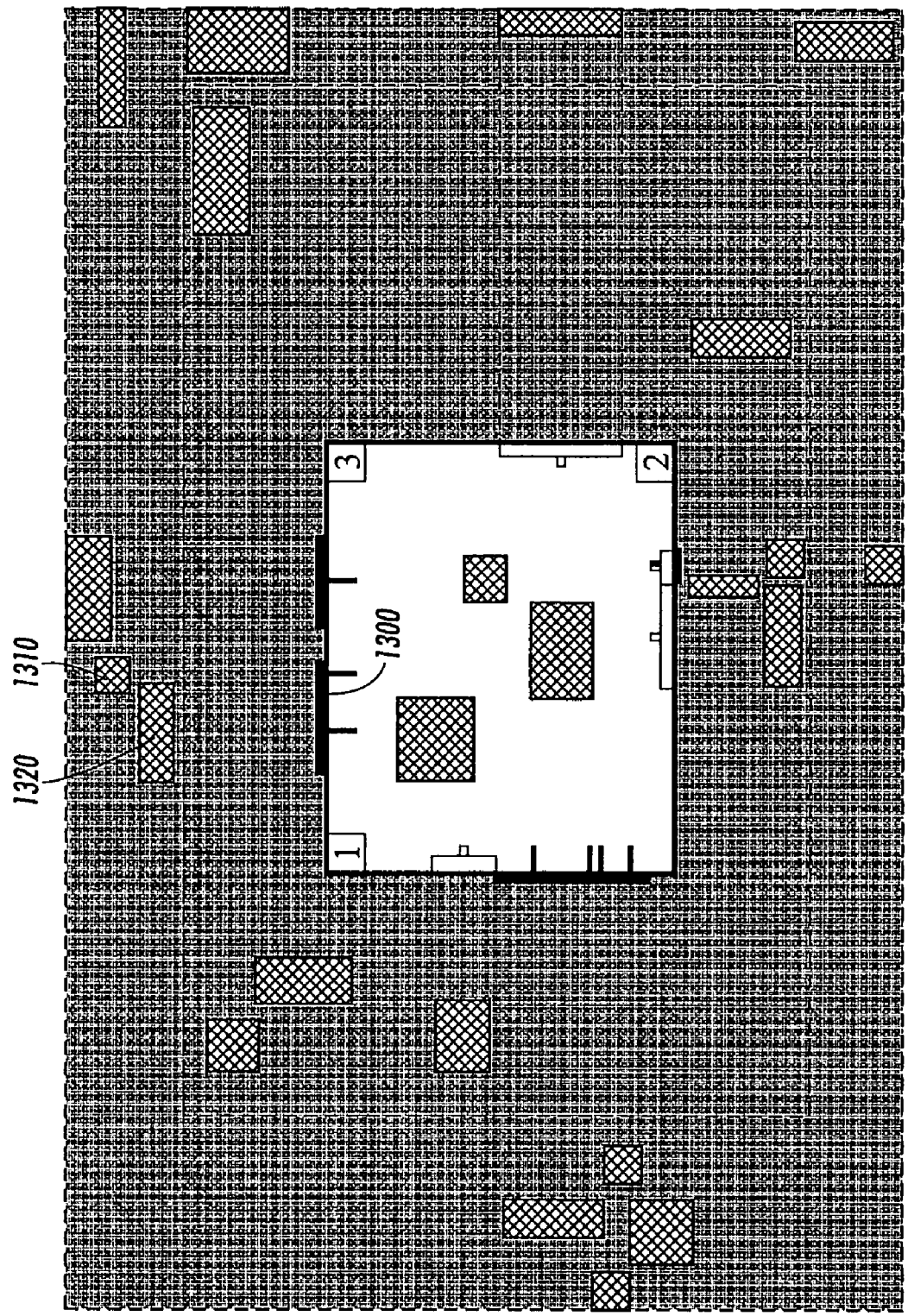
FIG. 12 shows a ninth exemplary embodiment of an indicating system according to this invention.

Because projection indicators may be used to map objects onto the window border, neighboring objects may often project to the same border location, which may lead to a situation where objects are underrepresented in the representation of the peripheral space. Clusters may be visually distinguished, for example, by projecting object bounds and object centers, as shown in, for example, FIG. 12. In this exemplary embodiment, an indicator 1300 indicates both a bound and a center of objects 1310 and 1320 to give a sense of both the size and number of clipped objects in a direction indicated by the indicator 1300.

Figure 13:
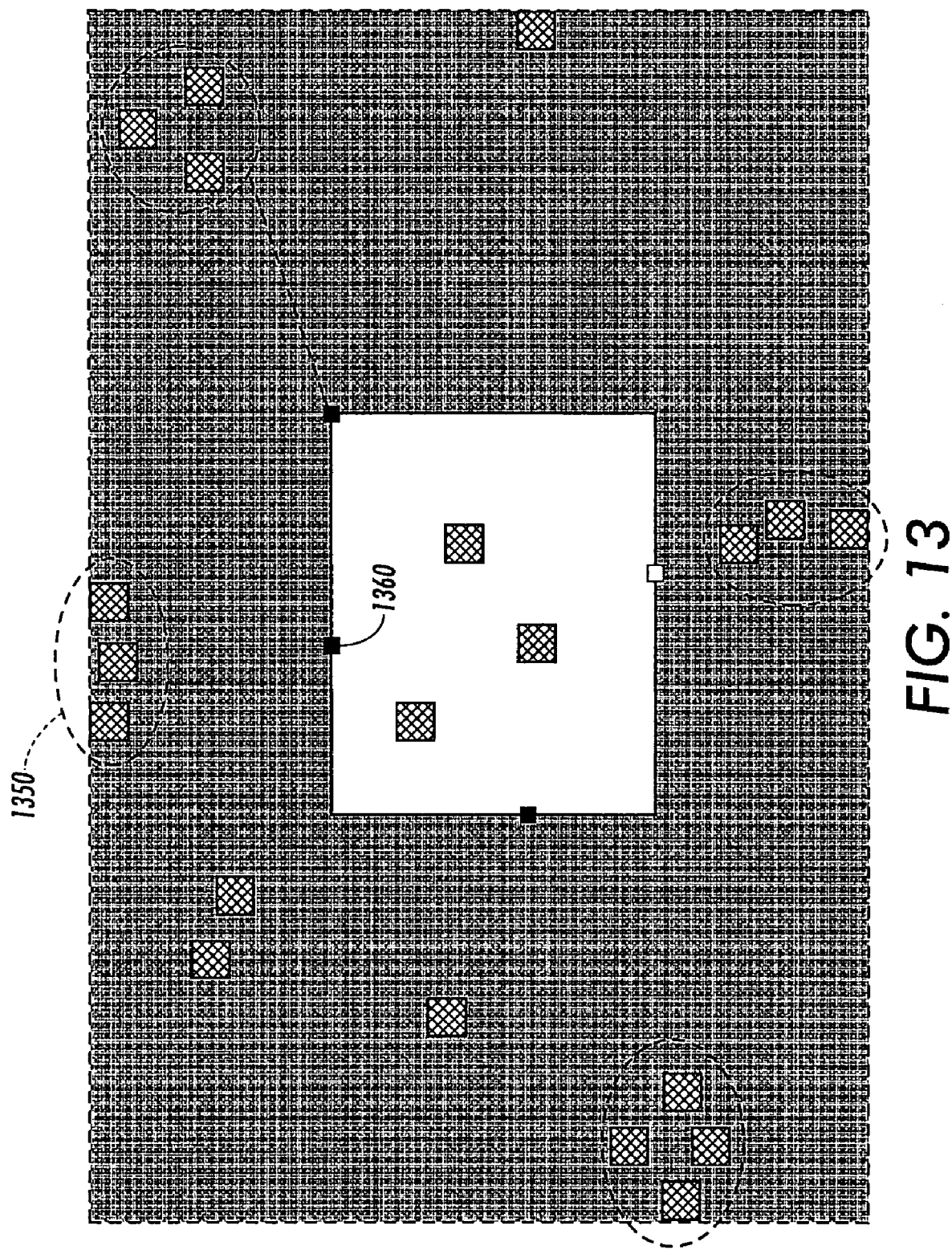
FIG. 13 shows a tenth exemplary embodiment of an indicating system according to this invention.

A tenth exemplary embodiment of indicators according to this invention displays only clusters of a certain size. In other words, indicators for clusters with more than a specified number of objects only may appear on borders of the viewed space. As shown in FIG. 13, only clusters, such as a cluster 1350, with at least three objects are represented by an indicator 1360. The indicator 1360 may also indicate the distance to the cluster 1350 by the color. Such technique can provide the user with a sense of visual grouping patterns that include more potentially important information. The number of the objects in a cluster may be more or less than three.

An exemplary visual technique that may be used to indicate object clustering is alpha transparency. With this technique, when multiple objects project to the same location, the transparent colors combine to create a brighter, more opaque color. This technique has an advantage that the indicators may give some indication of both individual objects and object clusters.

Figure 14:
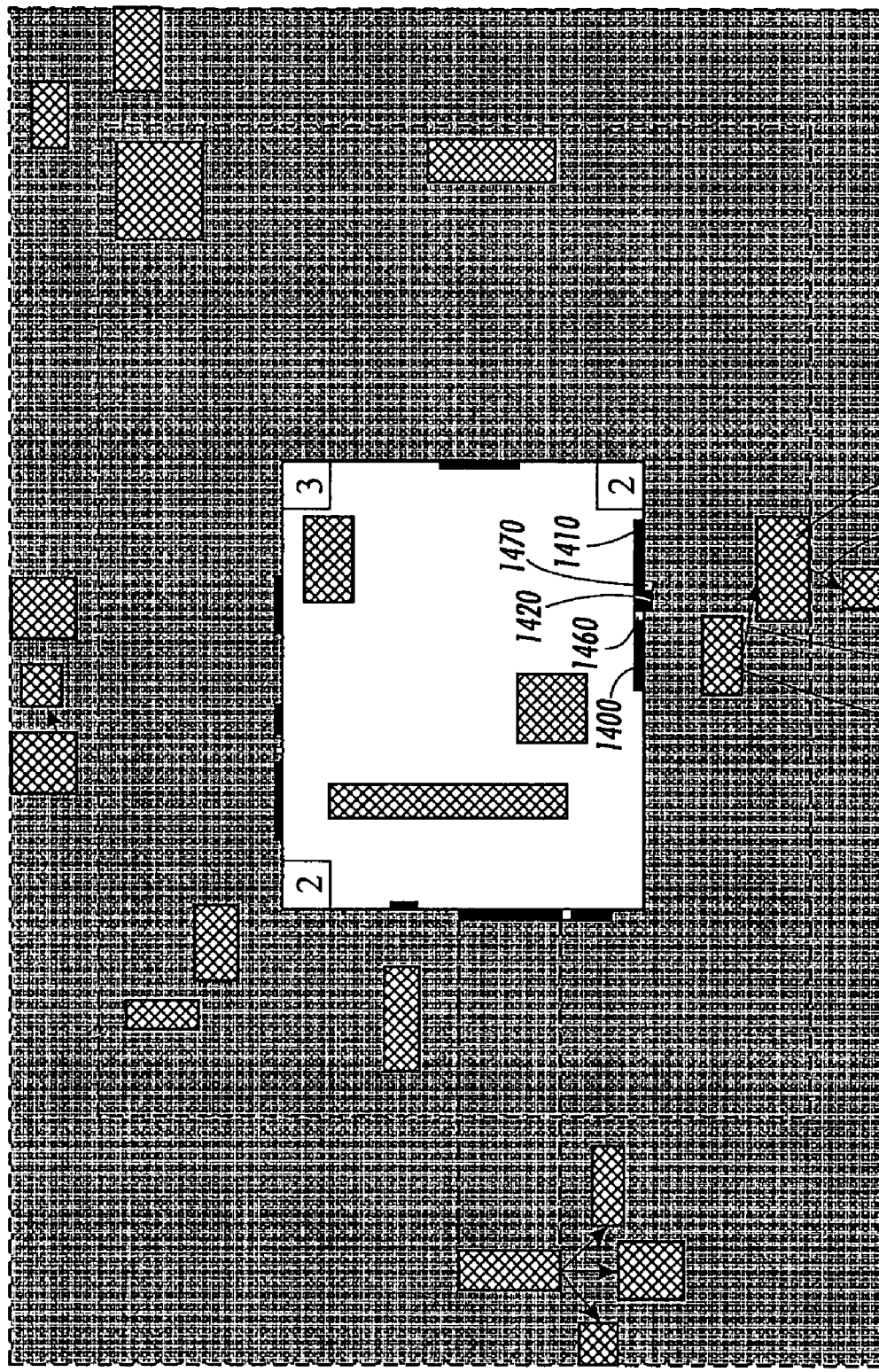
FIG. 14 shows an eleventh exemplary embodiment of an indicating system according to this invention.

Indicators may also be used to indicate the number of links between clipped objects. Since links are themselves a type of object, links may be like any other object, for example, using different visual properties. In an eleventh exemplary embodiment as shown in FIG. 14, indicators 1400, 1410 and 1420 map objects 1430, 1440 and 1450. Link indicators 1460 and 1470 indicate links 1480 and 1490 that link the objects 1400, 1410 and 1420, respectively. Near objects may appear in one color (e.g., red), far objects may appear in another color (e.g., blue), and links may appear in yet another color (e.g., yellow). In the event of competition for display space between objects and links, links may be given visual preference since links suggest the existence of objects whereas objects do not necessarily suggest the presence of links.

A twelfth exemplary embodiment of the indicators according to this invention allows the indicators to change in response to user interactions. For instance, if the user explicitly enters a set of search terms, the system can highlight matching clipped objects in the peripheral display. An example of such technique is described in a co-pending, co-assigned U.S. patent application Ser. No. 10/369,624, entitled "Methods and systems for Accelerating Interactive Classification of Information," which is incorporated herein by reference in its entirety.

Figure 15:
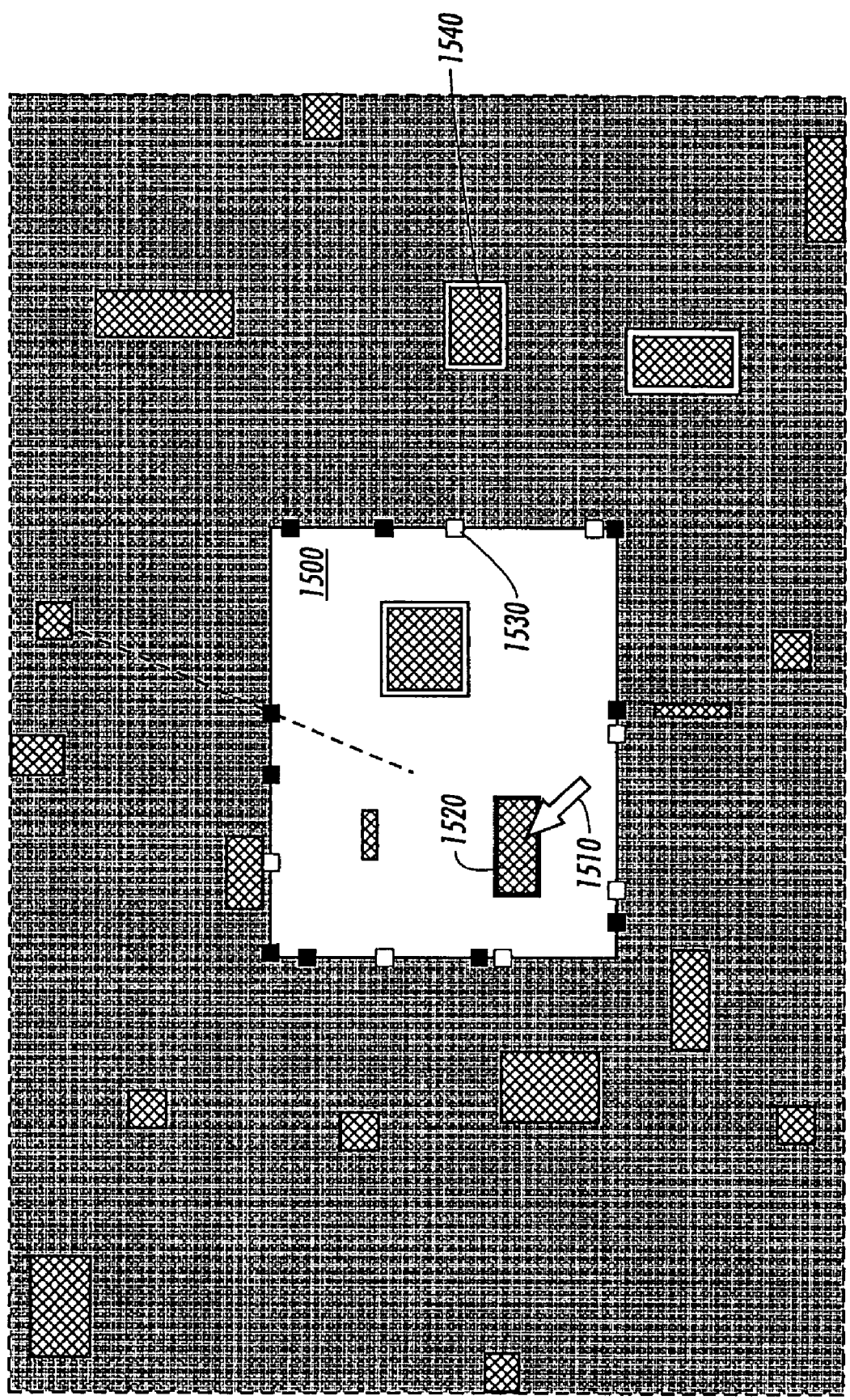
FIG. 15 shows a twelfth exemplary embodiment of an indicating system according to this invention.

In the twelfth exemplary embodiment shown in FIG. 15, indicators for objects in the populated space having a subject similar to the selected objects in the viewed space are also highlighted. In other words, when an object 1520 in the viewed space 1500 is selected by, for example, a mouse pointer 1510, similarity of other objects to the subject of the object 1520 is determined. If an object 1540 has a similar subject is highlighted, then an indicator 1530 on the border of the viewed space 1500 is highlighted.

Figure 16:
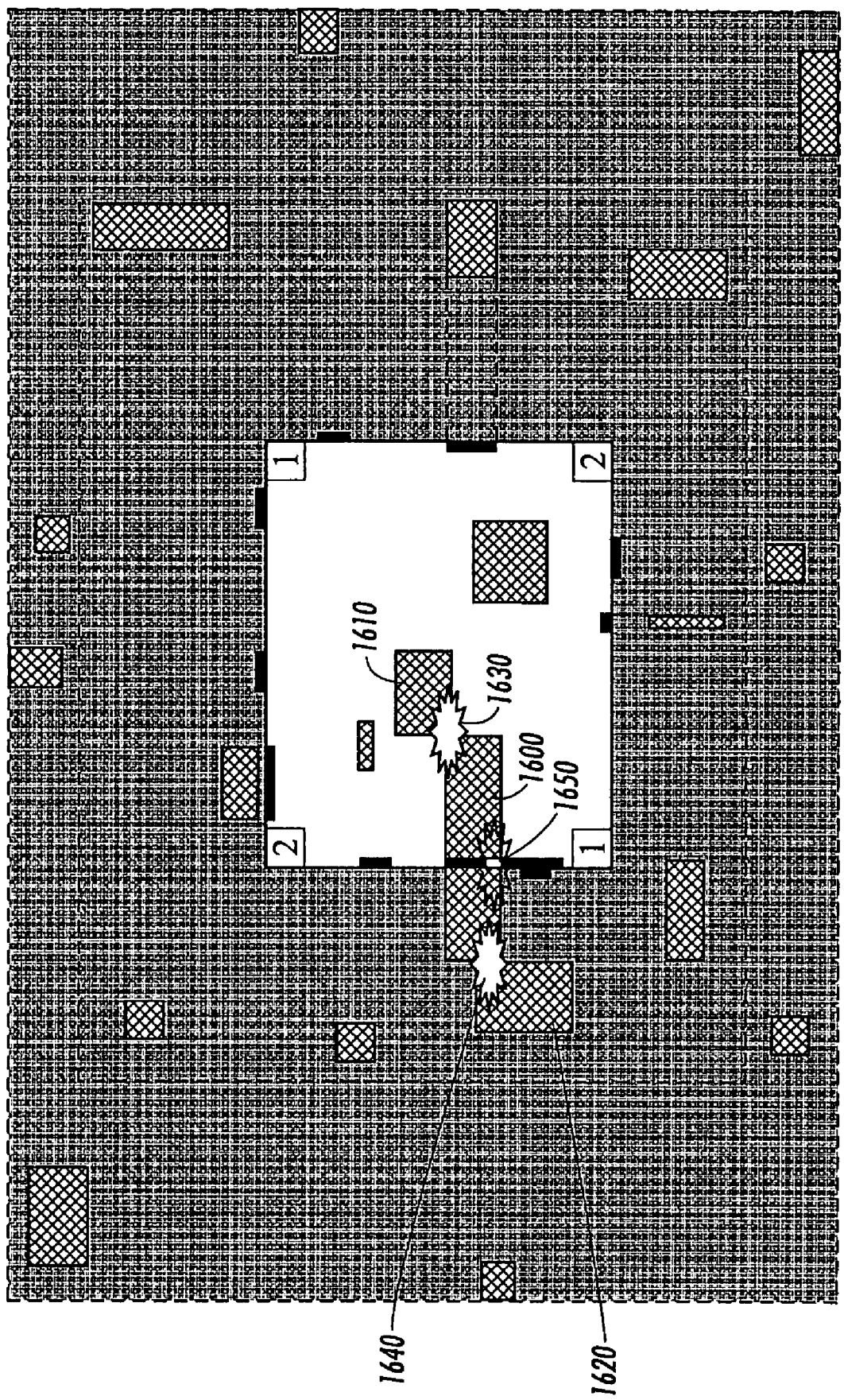
FIG. 16 shows a thirteenth exemplary embodiment of an indicating system according to this invention.

In a sensemaking application in which the indicators according to this invention may be used, spatial arrangements may have meaning. In sensemaking operations, it is common that the objects are not to occlude each other. That is, when overlapping of objects occurs, the objects may simply "bump" each other out of the way. This bumping can sometimes disturb important spatial arrangements that the user may have constructed. However, because the arrangements may hold meaning, the user may want to be notified when bumping has modified an existing arrangement that is outside the current view. FIG. 16 illustrates a thirteenth exemplary embodiment according to this invention. In FIG. 16, an object 1600 has bumped objects 1610 and 1620 at bumps 1630 and 1640, respectively. An indicator 1650 notifies the user that bumping has occurred outside the current view between the object 1600 and 1620. A flashing in a color (e.g., yellow) on the indicator 1650 may be used to indicate point at which the collision occurred. The indication does not have to be flashing, but can be any other suitable indication.

Figure 17:
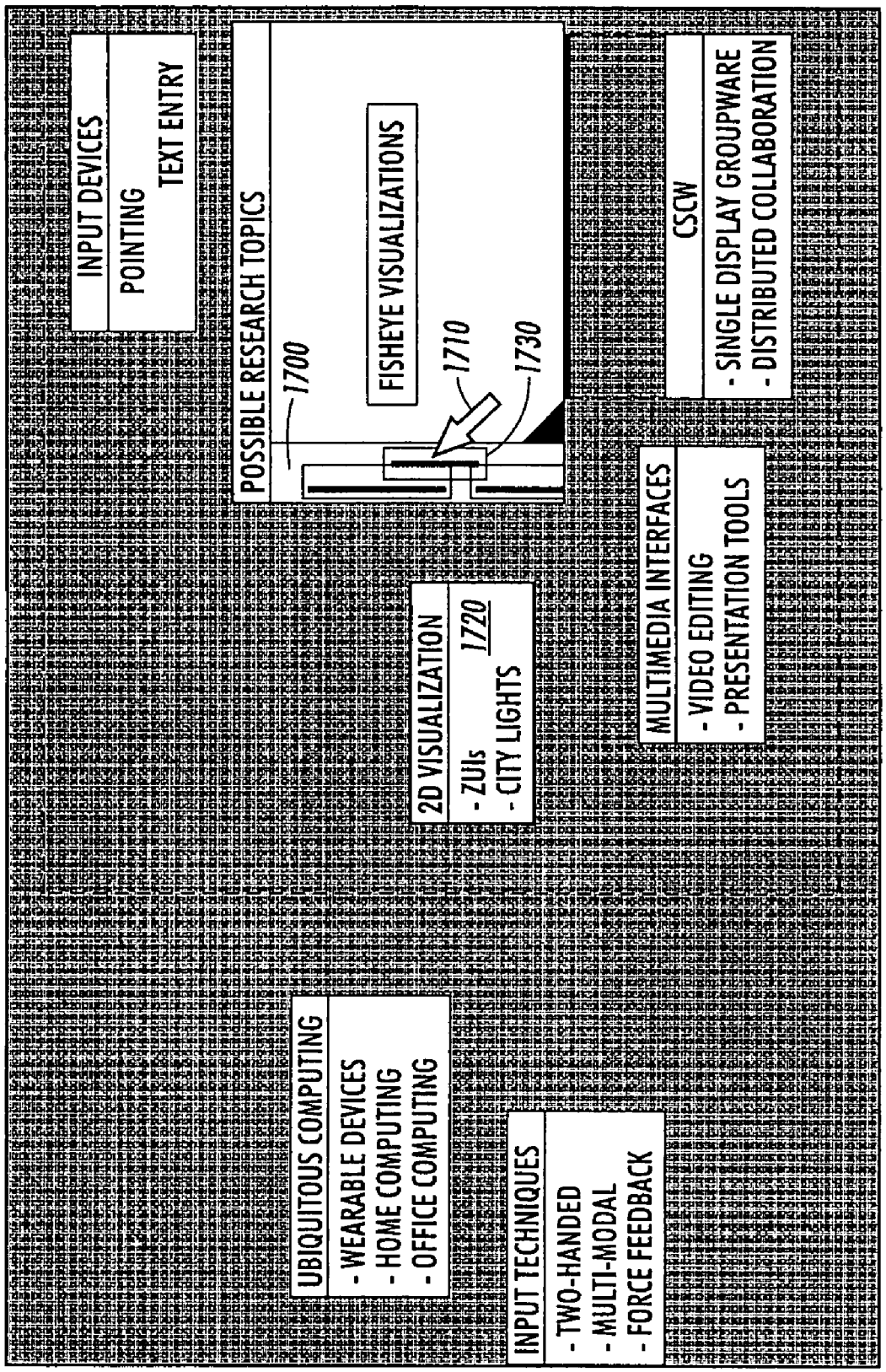
FIG. 17 shows a fourteenth exemplary embodiment of an indicating system according to this invention.

As described earlier, indicators may vary in size to display different levels of detail or support different levels of interactivity. A modification of the indicators may be one that swells to allow the user to interact with the display. FIG. 17 shows a fourteenth exemplary embodiment according to this invention, which illustrates swollen indicators. When the sensemaker locates a mouse pointer 1710 over a border 1700 on a side of the viewed space, the border 1700 expands to show more information. Such information may show, for example, history of an object 1720 with gray background rectangles 1730 (darker rectangles may indicate that a portion of space was in focus longer). The specific object 1720 may also be highlighted. This history information, for example, may be only made visible in the expanded display.

Figure 18:
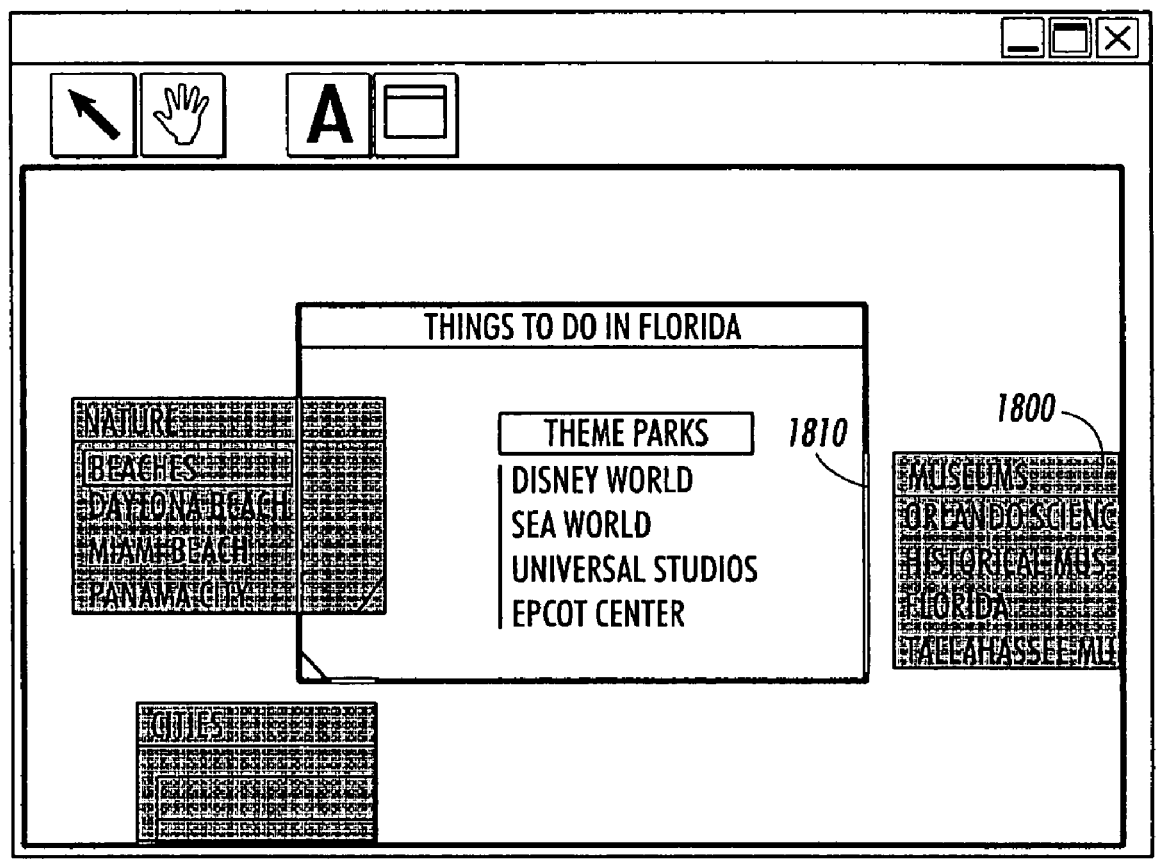
FIG. 18 shows a fifteenth exemplary embodiment of an indicating system according to this invention.

Another approach that may be combined with other designs is a transient "ghosted" visualization of the objects outside the current view. When applied to a given subspace, this visualization provides a translucent representation of clipped objects by a rendering on the screen surrounding the current view. Objects in this translucent layer may be highlighted in the color of the indicators to create a natural correspondence between an object and its indicator. FIG. 18 shows a fifteenth exemplary embodiment illustrating a ghosted visualization. In FIG. 18, an object 1800 is highlighted to correspond to the color of an indicator 1810. The above-described visualization technique may be more advantageous if only a relatively small portion of the screen is filled by objects.

Figure 19:
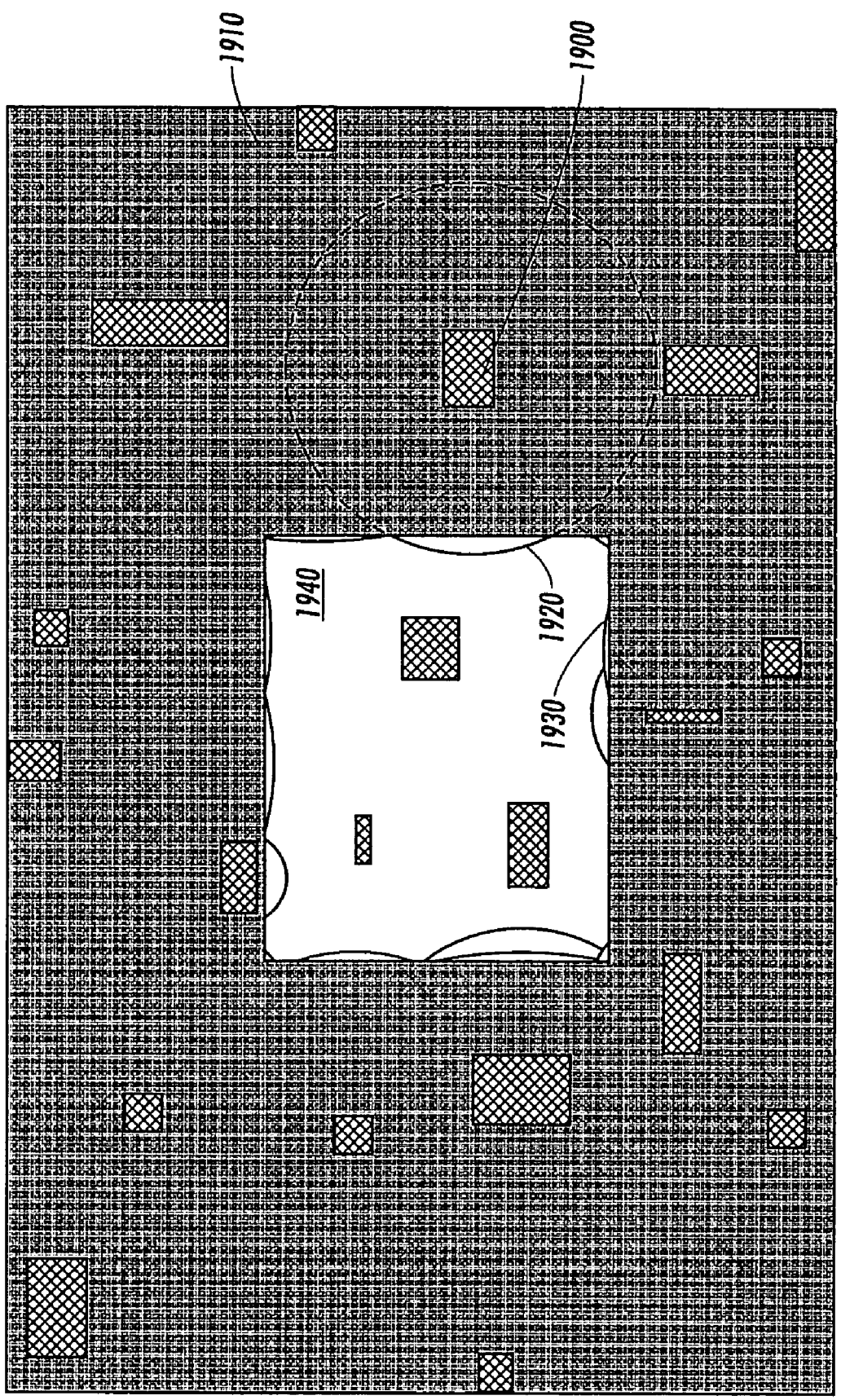
FIG. 19 shows a sixteenth exemplary embodiment of an indicating system according to this invention.

FIG. 19 shows a sixteenth exemplary embodiment of indicators, which are two-dimensional. In this exemplary embodiment, arcs are used to indicate an object in the peripheral space based on circles imaginarily drawn around the object as a center. As shown in FIG. 19, an object 1900 in a peripheral space 1910 is represented by an arc 1920 on a border 1930 of a viewed space 1940. The arc 1920 shows the direction and distance to the object 1900. In other words, if the curvature radius of the arc 1920 is small, then it indicates that the object is close to the viewed space 1940. On the other hand, if the curvature radius of the arc 1920 is large, then it means that the object is distant from the viewed space 1940. The diameter of the circle of the arc may be limited to a predetermined diameter, so that only objects in the near and far regions shown in FIG. 2, for example, may be indicated on the border.

In addition, the arc for a closer object may extend more inwardly from the border 1930 than the arc for a farther object. The degree of extension may be proportional to the distance to the object from the border. In this case, the user knows if the object is close to the viewed space 1940.

The arc 1920 may be a solid line. The solid line may be colored, for example, such that the distance to the object indicated by the arc may be determined from the color (e.g., darkness of the color). Alternatively, the area surrounded by the arc 1920 and the border 1930 may be colored. The color may fade or change as the distance from the object increases, so that areas closer to the object may have a darker color than areas farther towards the arc or have a different color.

The arcs may overlap each other if more than one arc is presented nearby on the border. In this case, the arc representing a closer object may be shown in foreground than the arc representing a distant object.

Figure 20:
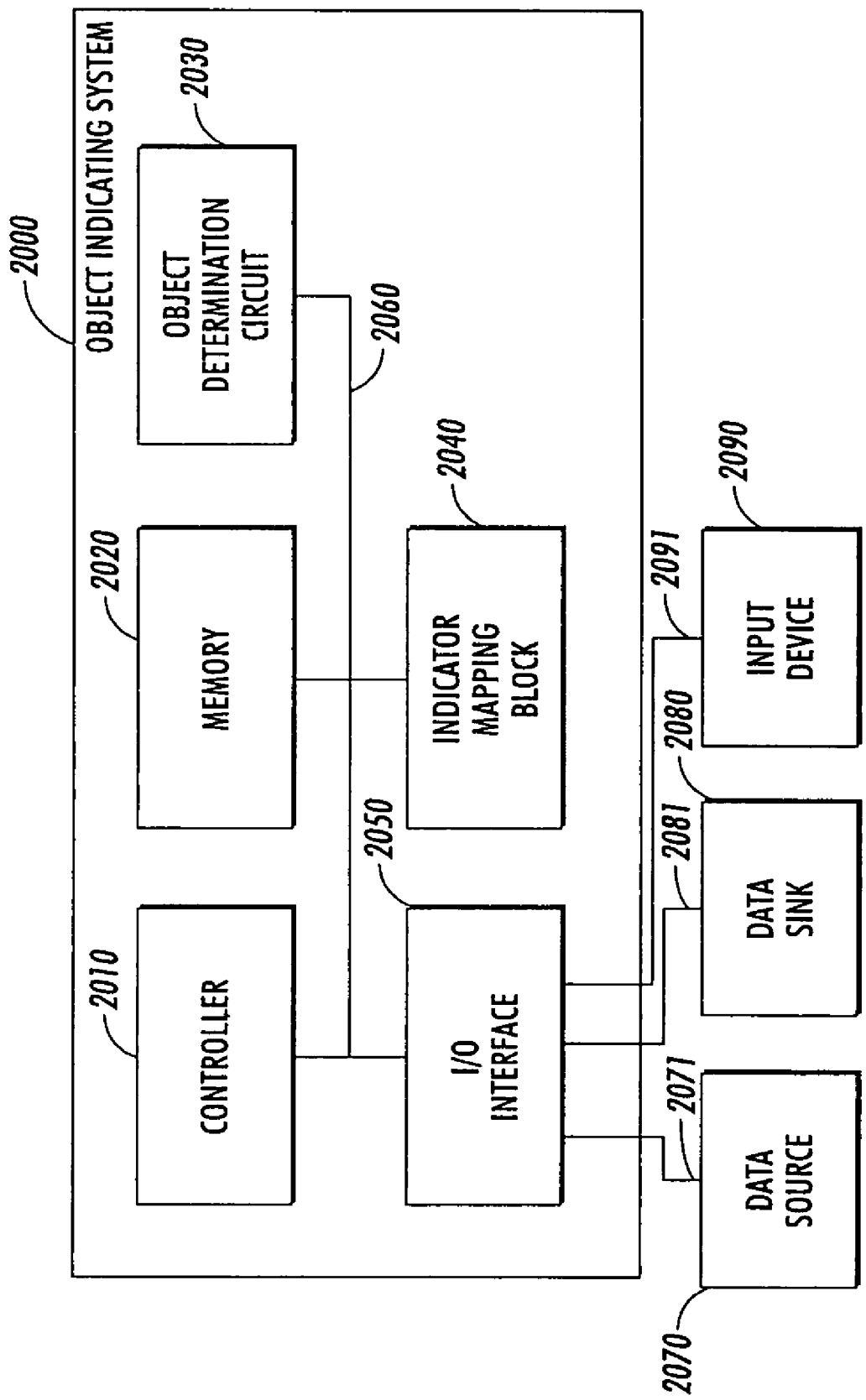
FIG. 20 is an exemplary block diagram of an indicating system according to this invention.

FIG. 20 shows an exemplary embodiment of an object indicating system 2000 according to this invention. The object indicating system 2000 includes a controller 2010, a memory 2020, an object determination circuit 2030, an indicator mapping block 2040, and an input/output interface 2050, which are interconnected via a communication link 2060. The input/output interface 2050 provides a connection between the object indicating system 2000, and a data source 2070, a data sink 2080 and a user input device 2090 via communication links 2071, 2081 and 2091, respectively.

In general, the data source 2070 can be any one of a number of different sources, such as a locally or remotely located computer sharing data, a scanner, or any other known or later-developed device that is capable of generating electronic data, such as a document. The data source 2070 may also be a data carrier, such as a magnetic storage disc, CD-ROM or the like. Similarly, the data source 2070 can be any suitable device that stores and/or transmits electronic media data, such as a client or a server of a network, intranet, or the Internet, and especially the World Wide Web. In various exemplary embodiments, the data source 2070 is a data storage device, and is connected to the object indicating system 2000 via the communication link 2060.

In addition, data from the data source 2070 may be scanned text of a physical document, data created electronically using any known or later developed programming language and/or computer software program, such as word processing software, and/or a spreadsheet shown in a spreadsheet program, or any other known or later developed text data source. The data may also be any graphical data, such as pictures, flowcharts, vector graphics tools, diagrams and the like.

The data sink 2080 can be any known or later-developed device that is capable of outputting or storing the processed electronic media data generated using the apparatus and method according to this invention, such as a display device, a printer, a copier or other image forming device, a facsimile device, a memory or the like. In addition, the data sink 2080 can be any known or later developed device that is capable of receiving the enhanced text data output by the object indicating system 2000 and either storing, transmitting, or displaying the text data. In various exemplary embodiments, the data sink 2080 is a display device and is connected to the object indicating system 2000 over the communication link 2081.

The user input device 2090 may be any known or later-developed device that is capable of inputting data and/or control commands to the object indicating system 2000 via the communication link 2091. The user input device 2090 may include one or more of a keyboard, a mouse, a touch pen, a touch pad, a pointing device, or the like.

It will be appreciated that the data source 2070, the data sink 2080 and/or the user input device 2090 may be incorporated into the same physical unit as the object indicating system 2000, or may be separate entities as shown.

The communication link 2060 can be any known or later-developed device or system for connecting the controller 2010, the memory 2020, the object determination circuit 2030, the indicator mapping circuit 2040, and the input/output interface 2050. In addition, the communication links 2071, 2081 and 2091 can be any known or later-developed devices or systems for connecting the data source 2070, the data sink 2080 and the user input device 2090, respectively, to the object indicating system 2000. These communication links 2060, 2071, 2081 and 2091 may be a direct cable or bus connection, a connection over a wide area network or local area network, a connection over an intranet, a connection over the Internet, or a connection over any other distributed processing network. Further, it should be appreciated that the communication links 2060, 2071, 2081 and 2091 can be wireless connections over a network. The network can be a local area network, a wide area network, an intranet, the Internet, or any other known or later-developed other distributed processing and storage network.

The controller 2010 controls data flow between components of the object indicating system 2000. The memory 2020 may serve as a buffer for information coming into or going out of the object indication system 2000, may store any necessary programs and/or data for implementing the functions of the object indicating system 2000, and/or may store other types of data, such as objects data at various stages of processing. In various exemplary embodiments, the memory 2020 may store location of objects in the workspace and links to and/or from the objects.

Alterable portions of the memory 2020 may be, in various exemplary embodiments, implemented using static or dynamic RAM. However, the memory 2020 can also be implemented using a floppy disk and disk drive, a writable or rewritable optical disk, disk drive, such as a hard disk drive, flash memory or the like. The generally static portions of the memory 2020 are, in various exemplary embodiments, implemented using ROM. However, the static portions can also be implemented using other non-volatile memory, such as PROM, EPROM, EEPROM, an optical ROM disk, such as a CD-ROM or DVD-ROM, and disk drive, flash memory or other alterable memory, as indicated above, or the like.

The object determination circuit 2030 determines the locations of objects in a workspace, that is, where each object is located in terms of distance from the viewed space and direction of its location. The object determination circuit 2030 may determine size and/or center of each object. Further, the object determination circuit 2030 may determine types of contents of each object.

Figure 21:
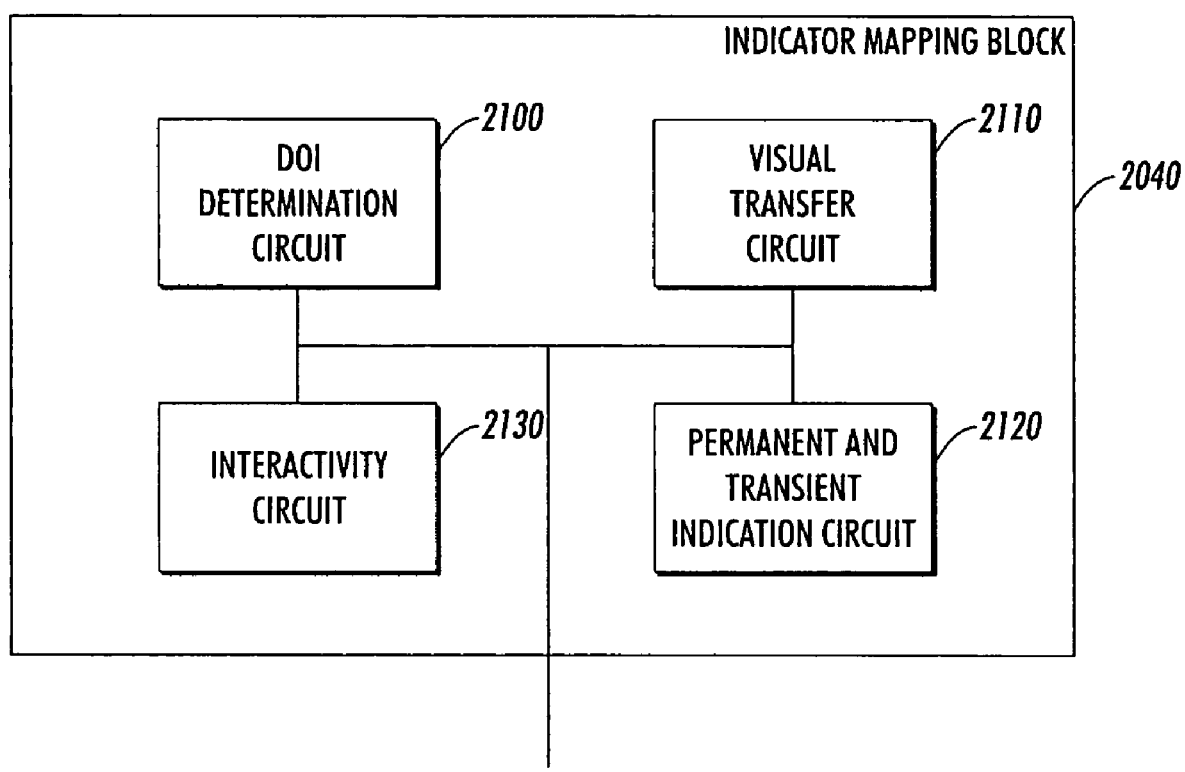
FIG. 21 is an exemplary block diagram of the indicator mapping block shown in FIG. 19.

The indicator mapping block 2040 maps indicators on a border of a viewed space, indicating objects in a populated space in accordance with the determination made by the object determination circuit 2030. The indicator mapping block 2040 may include, as shown in FIG. 21, a degree-of-interest (DOI) determination circuit 2100, a visual transfer circuit 2110, a permanent and transient indication circuit 2120, and an interactivity circuit 2130.

The degree-of-interest (DOI) determination circuit 2100 determines the relevance of objects in the populated space based on user's interest. The user's interest may be those that describe physical characteristics, such as size, shape, distance and/or scale. The DOI determination circuit 2100 may also determine a degree of interest based on such characteristics as the contents of the objects, history of the objects, and/or characteristics of object clusters.

The visual transfer circuit 2110 determines whether orthogonal, radial, or other projections are used, and how indicators are represented. For example, if an object is in a "near" space (i.e., near than a predetermined distance from the viewed space), the indicator may indicate the entire width and/or a center of the object, while if an object is in a "far" space (i.e., further than a predetermined distance from the viewed space), the indicator may only indicate the center of the object. In addition, the indicators of the far objects may be represented outside of the viewed space, while the near objects may be represented inside the viewed space. In addition, the visual transfer circuit 2110 may provide indicators in different color and/or shade based on the location and/or contents information of the object, and/or may provide indicators in a projected form. Moreover, the visual transfer circuit 2110 may provide an indicator in a flashing form if an object indicated by the indicator bumps other objects. Furthermore, the visual transfer circuit 2110 may provide an indicator indicating a link linking objects.

The permanent and transient indication circuits 2120 may provide various indicators. For example, the permanent and transient indication circuits 2120 may provide a ramping or swelling indicator. The interactivity circuit 2130 may provide an interaction interface to the indicators. For instance, the interactivity circuit 2130 may provide navigational aids, such as jumping to the information represented by the indicator.

Figure 22:
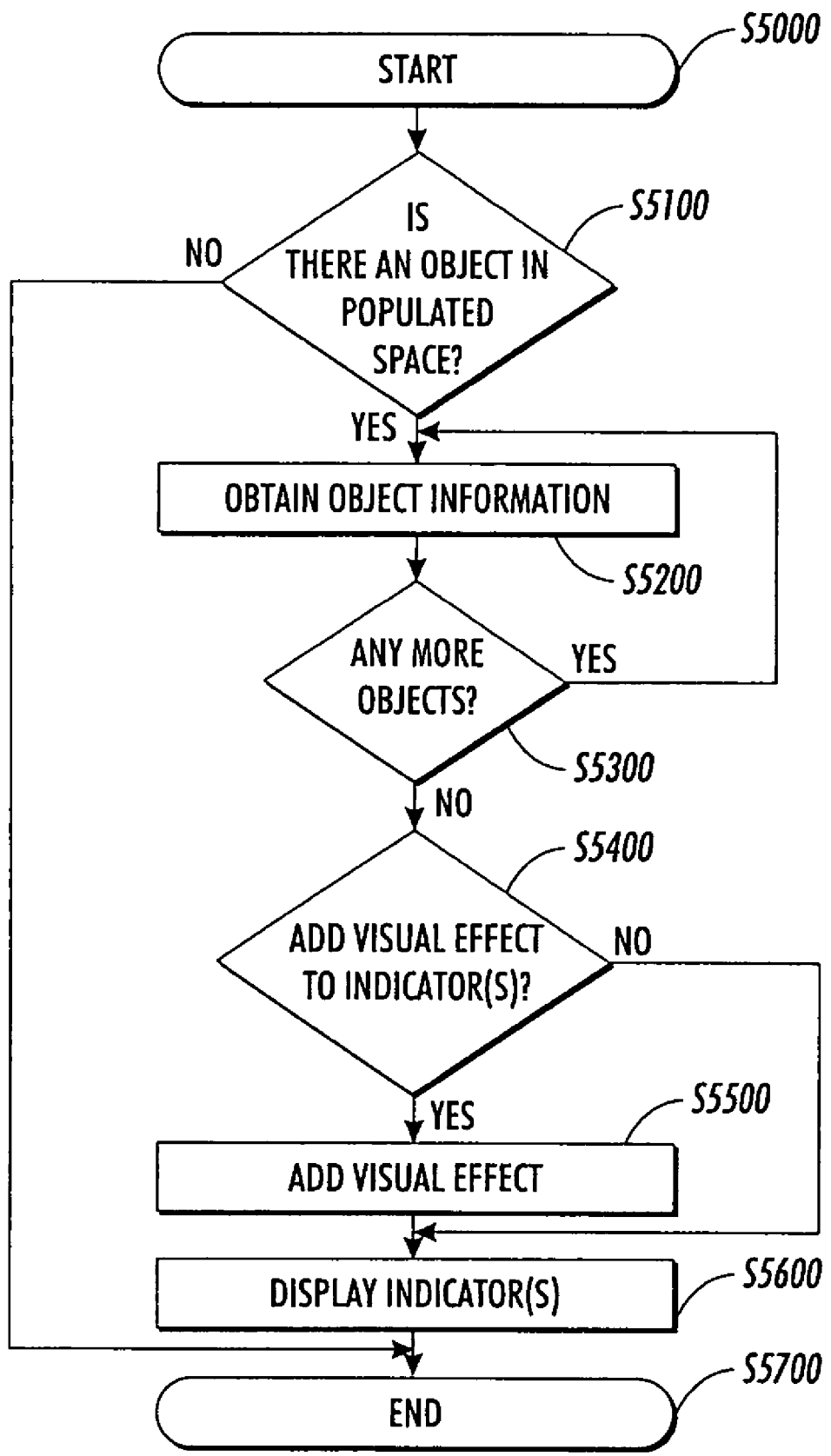
FIG. 22 is a flowchart showing an exemplary embodiment of a method for indicating objects in a workspace according to this invention.

FIG. 22 is a flowchart outlining an exemplary method for indicating objects in a workspace.

The process starts at step S5000 and continues to step S5100. In step S5100, a determination is made as to whether there is an object in a populated space. If so, the process continues to step S5200. Otherwise the process jumps to step S5700 where the process ends.

In step S5200, information of the object, such as direction, distance and/or contents, is obtained, and the process continues to step S5300. In step S5300, a determination is made as to whether there are more objects. If so, the process returns to step S5200. Otherwise the process continues to step S5400.

In step S5400, a determination is made as to whether a visual effect is needed for indicator indicating the object(s). If so, the process continues to step S5500. Otherwise, the process jumps to step S5600.

In step S5500, the visual effect is added to the indicator. The visual effect may be added based on the direction, distance and/or contents of the objects. Then, the process continues to step S5600. In step S5600, indicator is displayed on a border of window of a viewed space. The process then continues to and ends in step S5700.

Those skilled in the art will appreciate many applications for the present invention, including but not limited to display devices, such as systems that display applications of a personal computer, handheld devices, and the like. In short, the invention has application to any known or later developed system and device capable of indicating objects in the workspace.

In the various exemplary embodiments outlined above, the object indication system 2000 can be implemented using a programmed general-purpose computer. However, the system 2000 can also be implemented using a special purpose computer, a programmed microprocessor or microcontroller and peripheral integrated circuit elements, and ASIC or other integrated circuit, a digital signal processor, a hardware electronic or logic circuit, such as a discrete element circuit, a programmable logic device, such as PLD, PLA, FPGA or PAL, or the like. In general, any device, capable of implementing a finite state machine that is in turn capable of implementing the flowcharts shown in FIG. 22, can be used to implement the system 2000.

Each of the circuits or routines and elements of the various exemplary embodiments of the system 2000 outlined above can be implemented as portions of a suitable programmed general purpose computer. Alternatively, each of the circuits and elements of the various exemplary embodiments of the system 2000 outlined above can be implemented as physically distinct hardware circuits within an ASIC, or using FPGA, a PDL, a PLA or a PAL, or using discrete logic elements or discrete circuit elements. The particular form each of the circuits and elements of the various exemplary embodiments of the incremental multi-level text reduction system 2000 outlined above will take is a design choice and will be obvious and predictable to those skilled in the art.

Moreover, the various exemplary embodiments of the system 2000 outlined above and/or each of the various circuits and elements discussed above can each be implemented as software routines, managers or objects executing on a programmed general purpose computer, a special purpose computer, a microprocessor or the like. In this case, the various exemplary embodiments of the system 2000 and/or each or the various circuits and elements discussed above can each be implemented as one or more routines embedded in the communication network, as a resource residing on a server, or the like. The various exemplary embodiments of the system 2000 and the various circuits and elements discussed above can also be implemented by physically incorporating the system 2000 into software and/or a hardware system, such as the hardware and software system of a web server or a client device.

While this invention has been described in conjunction with the exemplary embodiments outlined above, it is evident that many alternatives, modifications and variations will become apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for indicating an object, comprising:

providing a workspace having a populated space and one or more view spaces on a display, each of the view spaces being a view of a part of the populated space that extends coordinates of each view space, each view space being delineated by a border having sides;

determining at least one object in the populated space;

determining a direction of the at least one object in the populated space from a view space;

determining a distance of the at least one object from the view space;

indicating only an object of the at least one object that exists outside the view space with a single indicator on a respective one of the sides closest to the at least one object to indicate the direction of the at least one object relative to the view space; and adding a visual effect to the single indicator based on the distance by indicating the single indicator on an inner bound of the border if the at least one object is inside a predetermined boundary in the view space delineating objects that are near the view space, and on an outer bound of the border if the at least one object is outside the predetermined boundary in the view space delineating objects that are far from the view space.

2. The method of claim 1, wherein indicating the at least one object with the single indicator comprises generating an orthogonal projection.

3. The method of claim 1, wherein indicating the at least one object with the single indicator comprises generating a corner indicator.

4. The method of claim 3, wherein generating the corner indicator includes indicating a number of objects in a corner area, the corner area being delineated by lines extended from each of adjoining sides of the border.

5. The method of claim 1, wherein indicating the at least one object with the single indicator comprises generating a radial projection.

6. The method of claim 1, wherein adding the visual effect to the single indicator includes altering a color of the single indicator based upon the determined distance.

7. The method of claim 1, wherein indicating the at least one object with the single indicator comprising generating an arc, wherein the arc is a part of a circle having the at least one object as a center of the circle.

8. The method of claim 7, wherein the arc extends farther into the view space from the border, a degree of the extension being proportional to the distance of the at least one object.

9. The method of claim 1, wherein indicating the at least one object with the single indicator includes indicating size of the at least one object.

10. The method of claim 1, wherein indicating the at least one object with the single indicator includes indicating a center of the at least one object.

11. The method of claim 1, wherein indicating the at least one object with the single indicator includes indicating an object having higher interest for a user, the higher interest determined by at least one of when an object was created, when the object was modified, how often the object was modified, and how long the object was in focus.

12. The method of claim 1, wherein determining the at least one object comprises determining a cluster of objects relatively near to each other in the populated space.

13. The method of claim 1, wherein indicating the at least one object with the single indicator further comprises indicating that there is a link object between the at least one object and another object.

14. The method of claim 1, further comprising:
determining a subject of a selected one of an object in the view space and a subject of the at least one object in the populated space, wherein the indicator is highlighted when the at least one object has a subject similar to the subject of the selected object in the view space.

15. The method of claim 1, wherein indicating the at least one object with the single indicator includes indicating a change in the at least one object in the populated space.

16. The method of claim 15, wherein the change includes a bump generated at a point where at least two objects bump against each other.

17. The method of claim 1, further comprising:
providing at least one interactive indicator on the border of at least one view space for hidden objects in the populated space; and
showing more information of the single indicator on the border at a user's command.

18. The method of claim 17, further comprising:
selecting the single indicator; and
highlighting the single indicator indicating an object in the populated space that is used recently.

19. The method of claim 1, further comprising providing a second view space larger than the view space, the second view space superimposing the view space and a part of the populated space around the view space, wherein the at least one object in the populated space is translucently colored.

20. The method of claim 1, wherein determining the at least one object comprises determining a relative location of the at least one object in the populated space, and the single indicator indicates a distance from the view space to the at least one object.

21. The method of claim 1, further comprising:
selecting the single indicator; and
interacting with the single indicator.

22. The method of claim 21, wherein interacting with the single indicator includes jumping to the at least one object by shifting coordinates in the populated space that are visible in the view space.

23. An object indicating system, comprising:
a display providing a workspace with a populated space and at least one view space, each view space being a view of a part of the populated space that extends coordinates of each view space, each view space being delineated by a border of the at least one view space having sides;
an object determination circuit that determines at least one object in a populated space and a direction of the at least one object in the populated space from a view space; and
an indicator mapping block that indicates only an object of the at least one object that exists outside the view space with a single indicator on a respective one of the sides closest to the at least one object to indicate the direction of the at least one object relative to the view space, wherein
the object determination circuit determines a distance of the at least one object from the view space, and the indicator mapping block adds visual effects to the single indicator based on the determined distance, and
the single indicator is indicated on an inner bound of border when the at least one object is within a predetermined distance, and on an outer bound of the border when the at least one object is not within the predetermined distance.

24. The system of claim 23, wherein the indicator mapping block includes a visual transfer circuit that indicates the single indicator using an orthogonal projection.

25. The system of claim 23, wherein the indicator mapping block includes a visual transfer circuit that indicates the single indicator using a corner indicator.

26. The system of claim 25, wherein the corner indicator indicates a number of objects in a corner area, the corner area being delineated by lines extended from each of adjoining sides of the border.

27. The system of claim 23, wherein the indicator mapping block includes a visual transfer circuit that indicates the single indicator using a radial projection.

28. The system of claims 23 wherein the indicator mapping block includes a visual transfer circuit that alters a color of the single indicator based upon the determined distance.

29. The system of claim 23, wherein the indicator mapping block includes a visual transfer circuit that indicates the single indicator using an arc, wherein the arc is a part of a circle having the at least one object as a center of the circle.

30. The system of claim 29, wherein the arc extends farther into the view space from the border, a degree of the extension being proportional to the distance to the at least one object.

31. The system of claim 23, wherein the single indicator indicates size of the at least one object.

32. The system of claim 23, wherein the single indicator indicates a center of the at least one object.

33. The system of claim 23, wherein the indicator mapping block includes a degree-of-interest (DOI) determination circuit that determines at least one of when the at least one object was created, when the at least one object was modified, how often the at least one object was modified, and how long the at least one object was in focus, and wherein the single indicator indicates an object with higher interest for a user, wherein the higher interest is determined by the DOI determination circuit.

34. The system of claim 23, wherein the at least one object is a cluster comprising a plurality of objects relatively near to each other in the extended coordinate system of the populated space.

35. The system of claim 23, wherein the indicator further indicates that there is a link object between the at least one object and another object.

36. The system of claim 23, wherein the object determination circuit determines a subject of a selected one of an object in the view space and a subject of the at least one object in the populated space, and wherein the indicator is highlighted when the at least one object has a subject similar to the subject of the selected object in the view space.

37. The system of claim 23, wherein the object determination circuit determines a change in the at least one object in the populated space, and wherein the indicator mapping block maps the indicator indicating the change.

38. The system of claim 37, wherein the change includes a bump generated at a point where at least two objects bump against each other.

39. The system of claim 23, wherein the object determining circuit provides at least one interactive indicator on the border of at least one view space for hidden objects in the populated space, and the indicator mapping block includes a permanent and transient indication circuit that shows more information of the single indicator on the border at a user's command.

40. The system of claim 39, wherein the single indicator indicating an object in the populated space that is used recently is highlighted.

41. The system of claim 23, wherein the indicator mapping block provides a second view space larger than the view space, and superimposes the at least one object in the populated space of the second view space onto the view space and a part of the populated space around the view space, and wherein the at least one object in the populated space is translucently colored.

42. The system of claim 23, wherein the object determination circuit determines a relative location of the at least one object in the populated space, and wherein the single indicator indicates a distance from the view space to the at least one object.

43. The system of claim 23, the indicator mapping block includes an interactivity circuit that interacts with the single indicator.

44. The system of claim 43, wherein the interactivity circuit interacts with the single indicator by jumping to the at least one object by shifting coordinates in the populated space that are visible in the view space.

45. A method for indicating an object, comprising:
providing a workspace having a populated space and one or more view spaces on a display, each of the view spaces being a view of a part of the populated space that extends coordinates of each view space, each view space being delineated by a border having sides;
determining at least one object in the populated space;
determining a direction of the at least one object in the populated space from a view space; and
indicating only an object of the at least one object that exists outside the view space with a single indicator on a respective one of the sides closest to the at least one object to indicate the direction of the at least one object relative to the view space, wherein
indicating the at least one object with the single indicator comprises generating a corner indicator, and
generating the corner indicator includes indicating a number of objects in a corner area, the corner area being delineated by lines extended from each of adjoining sides of the border.

46. An object indicating system, comprising:
a display providing a workspace with a populated space and at least one view space, each view space being a view of a part of the populated space that extends coordinates of each view space, each view space being delineated by a border of the at least one view space having sides;
an object determination circuit that determines at least one object in a populated space and a direction of the at least one object in the populated space from a view space; and
an indicator mapping block that indicates only an object of the at least one object that exists outside the view space with a single indicator on a respective one of the sides closest to the at least one object to indicate the direction of the at least one object relative to the view space, wherein
the indicator mapping block includes a visual transfer circuit that indicates the single indicator using a corner indicator, and
the corner indicator indicates a number of objects in a corner area, the corner area being delineated by lines extended from each of adjoining sides of the border.

* * * * *